US012412060B2

(12) United States Patent
Wang

(10) Patent No.: US 12,412,060 B2
(45) Date of Patent: Sep. 9, 2025

(54) PASSIVE RFID TAG WITH EMBEDDED SENSOR INTERFACE

(71) Applicant: Qatar Foundation for Education, Science and Community Development, Doha (QA)

(72) Inventor: Bo Wang, Doha (QA)

(73) Assignee: HAMAD BIN KHALIFA UNIVERSITY, Doha (QA)

( * ) Notice: Subject to any disclaimer, the term of this patent is extended or adjusted under 35 U.S.C. 154(b) by 674 days.

(21) Appl. No.: 17/875,053

(22) Filed: Jul. 27, 2022

(65) Prior Publication Data

US 2022/0366203 A1   Nov. 17, 2022

Related U.S. Application Data

(63) Continuation of application No. 17/114,362, filed on Dec. 7, 2020, now Pat. No. 11,423,275.

(60) Provisional application No. 62/944,764, filed on Dec. 6, 2019.

(51) Int. Cl.
G06K 19/07 (2006.01)
G06K 19/073 (2006.01)

(52) U.S. Cl.
CPC ..... G06K 19/0707 (2013.01); G06K 19/0723 (2013.01); *G06K 19/07327* (2013.01)

(58) Field of Classification Search
CPC ......... G06K 19/07327; G06K 19/0723; G06K 19/0707

See application file for complete search history.

(56) References Cited

U.S. PATENT DOCUMENTS

| 4,217,645 | A | 8/1980 | Barry et al. |
| 5,539,892 | A | 7/1996 | Reininger et al. |
| 5,648,972 | A | 7/1997 | Gharakhanian |
| 6,340,932 | B1 | 1/2002 | Rodgers et al. |
| 6,509,825 | B1 * | 1/2003 | Smit ................. H03F 3/195 |
|  |  |  | 235/382 |
| 7,689,195 | B2 | 3/2010 | Wu et al. |
| 8,265,769 | B2 | 9/2012 | Denison |
| 8,554,033 | B2 | 10/2013 | Kewitsch |

(Continued)

FOREIGN PATENT DOCUMENTS

WO    2007014053 A2    2/2007

*Primary Examiner* — Daniel I Walsh
(74) *Attorney, Agent, or Firm* — K&L Gates LLP

(57) ABSTRACT

A CMOS analog sensor interface circuit embedded in a passive RFID platform can provide accurate data conversion from analog signals to their digital representations. This interface can also utilize the RFID platform to achieve wireless data transmission. The disclosed sensor interface circuit includes signal filtering, signal amplification, as well as signal digitization. These circuits are all designed under the constraints of low-power operation on a noisy silicon substrate. By using the disclosed circuit design, fully passive wireless sensing network that can integrate with heterogeneous sensors (resistance, voltage, current types) can be designed. The advantages of low-cost, small feature size, and the ability to interface with analog sensors can enable large-scale deployment of such kind of RFIDs, both for consumer electronics like in-door monitoring and industrial sensing applications like the grid, electric vehicle, motor, and other critical infrastructures.

8 Claims, 19 Drawing Sheets

(56) References Cited

U.S. PATENT DOCUMENTS

| | | | |
|---|---|---|---|
| 8,952,792 B1* | 2/2015 | Srinivas | H01Q 1/248 |
| | | | 363/139 |
| 9,294,049 B2* | 3/2016 | Huijsing | H03F 3/45475 |
| 9,607,188 B2* | 3/2017 | Rokhsaz | H01Q 1/2225 |
| 9,613,237 B2 | 4/2017 | Nikunen et al. | |
| 10,140,566 B2 | 11/2018 | Viikari | |
| 10,210,445 B2* | 2/2019 | Nikunen | G06K 19/0716 |
| 10,819,359 B2* | 10/2020 | Omran | H03M 1/1009 |
| 11,423,275 B2* | 8/2022 | Wang | G06K 19/0707 |
| 11,510,748 B2* | 11/2022 | Mann | G06K 7/10366 |
| 11,523,488 B1* | 12/2022 | Recker | H05B 47/105 |
| 2002/0083293 A1 | 6/2002 | Harris et al. | |
| 2003/0015478 A1* | 1/2003 | Kuennen | C02F 9/20 |
| | | | 210/748.11 |
| 2004/0036626 A1 | 2/2004 | Chan et al. | |
| 2005/0195093 A1 | 9/2005 | Karschnia et al. | |
| 2005/0237163 A1* | 10/2005 | Lee | G06K 19/07767 |
| | | | 340/426.36 |
| 2007/0091006 A1* | 4/2007 | Thober | H01Q 7/005 |
| | | | 343/745 |
| 2007/0142015 A1 | 6/2007 | Brandley et al. | |
| 2007/0236851 A1* | 10/2007 | Shameli | G06K 19/0701 |
| | | | 361/113 |
| 2008/0018475 A1 | 1/2008 | Breed et al. | |
| 2008/0032655 A1* | 2/2008 | Kawasaki | H04B 1/525 |
| | | | 455/280 |
| 2008/0094179 A1 | 4/2008 | Domenico et al. | |
| 2008/0186174 A1 | 8/2008 | Alexis et al. | |
| 2009/0174529 A1* | 7/2009 | Hertwig | H04B 1/59 |
| | | | 340/10.5 |
| 2011/0063091 A1 | 3/2011 | Kang | |
| 2012/0092127 A1* | 4/2012 | Ganapathi | G06F 3/04144 |
| | | | 340/5.53 |
| 2012/0129301 A1 | 5/2012 | Or-Bach et al. | |
| 2012/0248187 A1* | 10/2012 | Piazza | H01Q 3/00 |
| | | | 235/439 |
| 2012/0280828 A1 | 11/2012 | Kim | |
| 2013/0329754 A1 | 12/2013 | Shin | |
| 2014/0077878 A1 | 3/2014 | Hsieh | |
| 2014/0104044 A1* | 4/2014 | Morimoto | H04B 5/77 |
| | | | 340/10.51 |
| 2015/0185134 A1 | 7/2015 | Chen et al. | |
| 2015/0311868 A1* | 10/2015 | Wan | H03F 1/0266 |
| | | | 330/9 |
| 2015/0327329 A1* | 11/2015 | Zhou | H04W 88/06 |
| | | | 455/553.1 |
| 2016/0204782 A1* | 7/2016 | Lee | G11C 29/028 |
| | | | 365/189.17 |
| 2016/0267769 A1* | 9/2016 | Rokhsaz | H01Q 9/0442 |
| 2016/0328584 A1* | 11/2016 | Rokhsaz | G06K 7/10326 |
| 2017/0228038 A1* | 8/2017 | Tangen | G06F 1/1669 |
| 2018/0091193 A1* | 3/2018 | Hagedorn | G06K 7/10366 |
| 2018/0165396 A1 | 6/2018 | Lin et al. | |
| 2018/0254779 A1* | 9/2018 | Omran | H03M 1/1009 |
| 2019/0068245 A1* | 2/2019 | Tramoni | H04B 5/26 |
| 2019/0250261 A1 | 8/2019 | Itkin | |
| 2020/0382146 A1 | 12/2020 | Naniwa et al. | |
| 2021/0097363 A1* | 4/2021 | Yadegari | G06K 19/0723 |
| 2021/0102197 A1* | 4/2021 | Sabeti | G16B 40/20 |
| 2021/0124078 A1* | 4/2021 | Widmer | H05B 1/0288 |
| 2021/0174157 A1* | 6/2021 | Wang | G06K 19/0723 |
| 2021/0318178 A1* | 10/2021 | Cassella | G01K 7/34 |
| 2022/0108090 A1* | 4/2022 | Mazza | G06K 19/07788 |
| 2022/0198236 A1* | 6/2022 | Pichler | G06K 19/0724 |
| 2023/0336123 A1* | 10/2023 | Plouchart | H03L 7/099 |
| 2024/0242052 A1* | 7/2024 | Gerber | G01D 21/00 |
| 2025/0035688 A1* | 1/2025 | Gossmann | G01R 27/2605 |

* cited by examiner

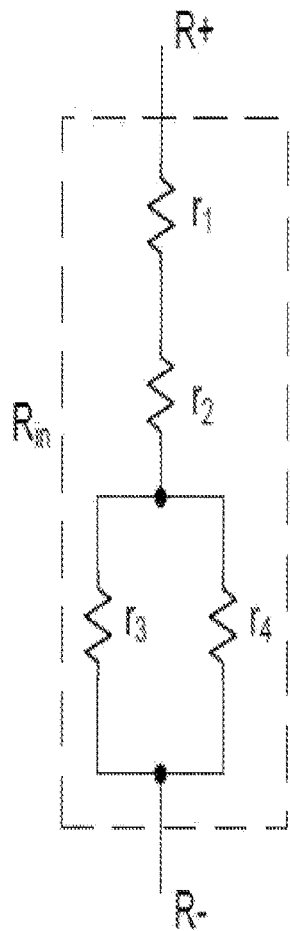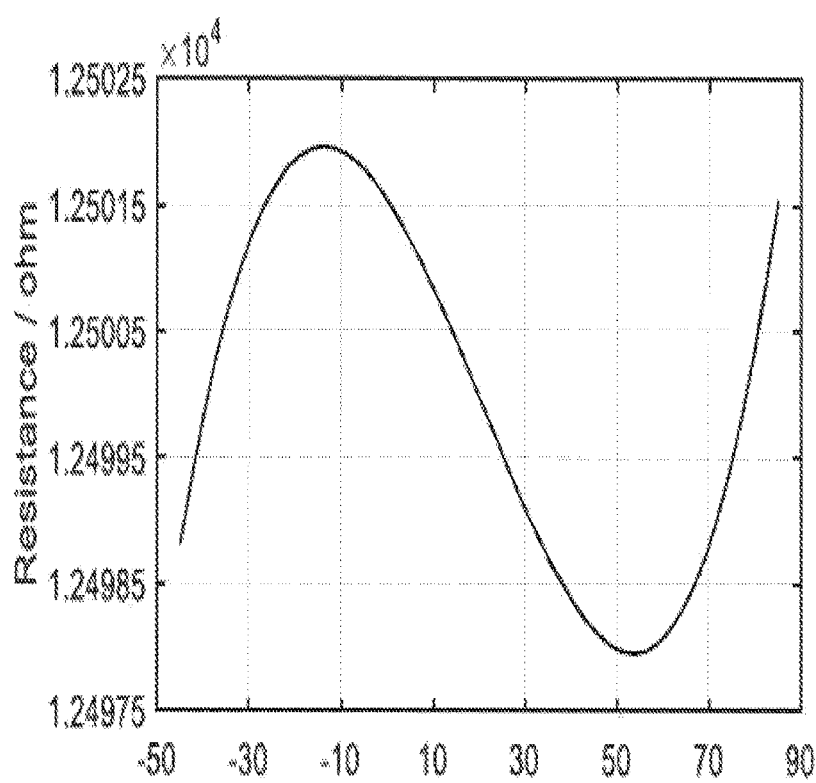
Fig. 5A
Fig. 5B

Fig. 7D
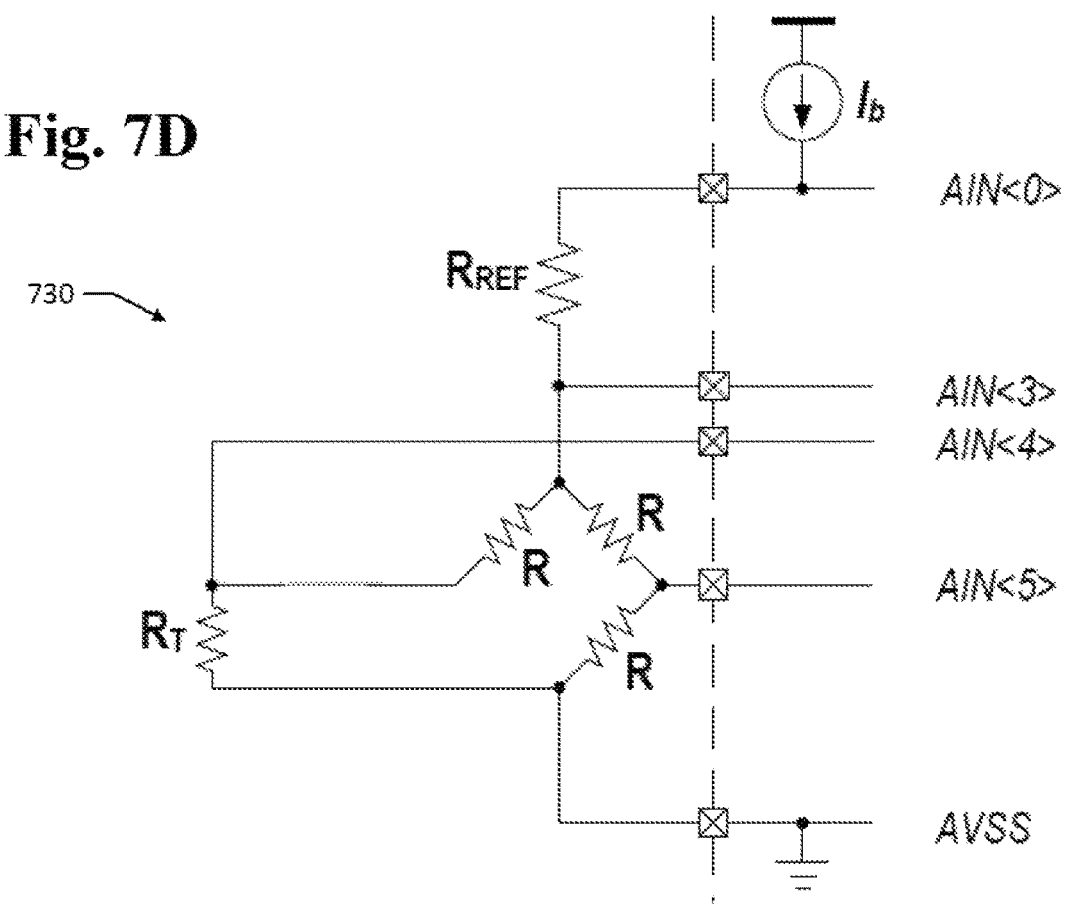
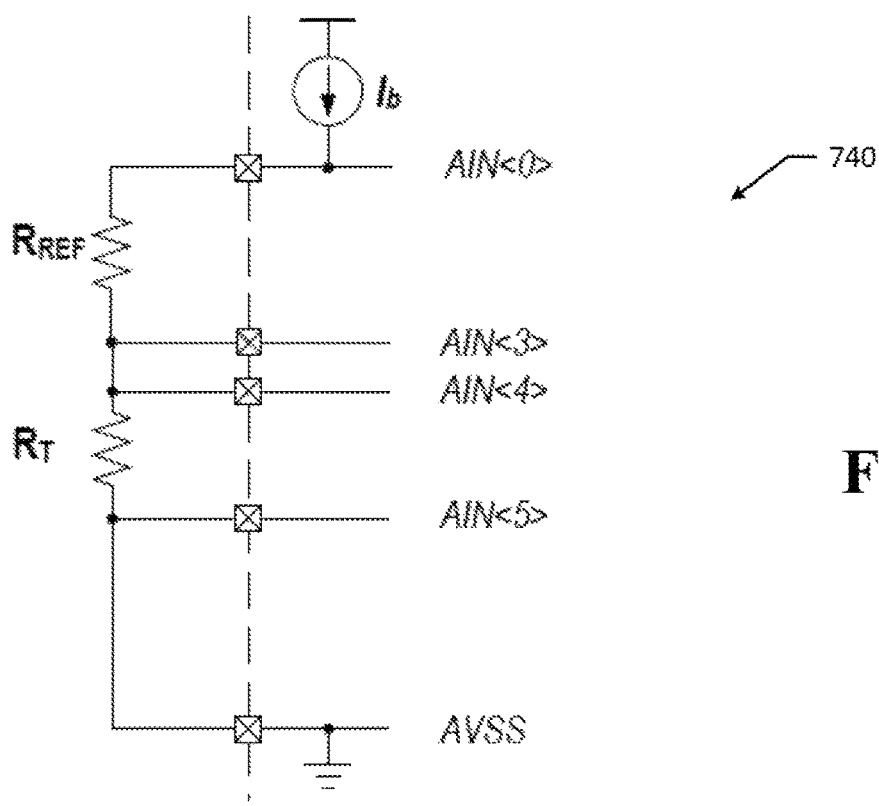
Fig. 7E

Fig. 7F                    Fig. 7G

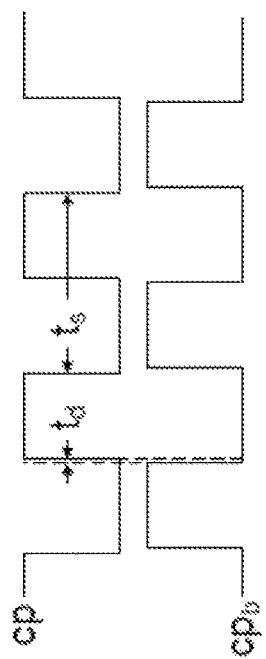
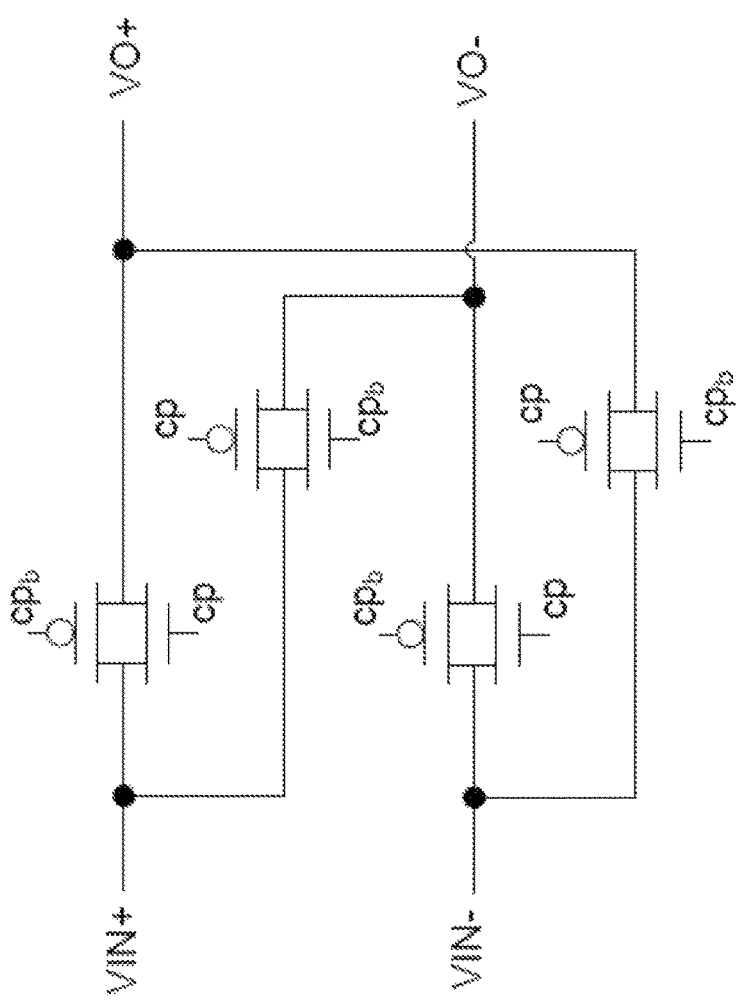
Fig. 9B
Fig. 9A

PASSIVE RFID TAG WITH EMBEDDED SENSOR INTERFACE

PRIORITY CLAIM

The present application is a continuation of U.S. patent application Ser. No. 17/114,362 filed on Dec. 7, 2020 claims priority to and the benefit of U.S. Provisional Application 62/944,764, filed Dec. 6, 2019, the entirety of which is herein incorporated by reference.

BACKGROUND

Radio-frequency identification (RFID) uses electromagnetic fields to automatically identify and track tags attached to objects. The tags typically contain electronically stored information. Passive tags collect energy from a nearby RFID reader's interrogating radio waves to sustain the integrated circuits' operation. Many prior art RFID tags can only provide ID information; however, certain applications require sensing capabilities such as applications in the smart grid, automobiles, and smart buildings, where batteries cannot be used but accurate sensing functions are mandatory. By integrating sensors into a passive RFID platform, fully passive wireless sensing network can be built. However, embedding sensors into an RFID platform is nontrivial as the available power is low and the substrate is noisy, which make it difficult to achieve accurate sensing. Therefore, there exists a need for a passive RFID tag embedded with sensors.

SUMMARY

The present disclosure describes a sensor interface that can be integrated into a fully passive RFID platform at least in part because of the system-level design and power/energy optimization. In some instances, the provided sensor interface may be used as standalone circuits for sensor signal reading, or may be integrated into other systems besides RFID.

In an example, a passive RFID tag includes an RFID chip and a sensor interface integrated with the RFID chip in the passive RFID tag. The sensor interface includes a plurality of analog input pins configured to interface with external sensing devices. A first portion of the analog input pins connect to an internal temperature compensated composite resistor. A current source is connected to a second portion of the analog input pins. The sensor interface further includes a first multiplexer configured to be controlled to select an input pair from the plurality of analog input pins for signal conversion. A third portion of the analog input pins and an instrumentation amplifier connect to the first multiplexer. The sensor interface further includes a second multiplexer and a third multiplexer. An analog-to-digital converter is connected to the second and third multiplexers. The sensor interface also includes a digital controller configured to process the digital output bitstream of the analog-to-digital converter.

In another example, a passive RFID tag includes an RFID chip and a sensor interface integrated with the RFID chip in the passive RFID tag. The sensor interface includes an instrumentation amplifier including a first capacitor array connected to a positive terminal of an input voltage and a negative terminal of a reference voltage. The first capacitor array includes a first input capacitor bank having a plurality of capacitors, a first feedback capacitor, and a first reference capacitor bank having a plurality of capacitors. The plurality of capacitors of the first input capacitor bank include a first capacitor, a second capacitor, and a third capacitor. The instrumentation amplifier also includes a second capacitor array connected to a negative terminal of the input voltage and a positive terminal of the reference voltage. The second capacitor array includes a second input capacitor bank having a plurality of capacitors, a second feedback capacitor, and a second reference capacitor bank having a plurality of capacitors.

In this example instrumentation amplifier, the input voltage is amplified by a gain determined by a ratio of a total capacitance ($C_{IN\_TOTAL}$) divided by a feedback capacitance ($C_{FB}$) of the first feedback capacitor. The total capacitance ($C_{IN\_TOTAL}$) is equal to a sum of a first capacitance of the first capacitor and a second capacitance of the second capacitor if a set gain is high. The total capacitance ($C_{IN\_TOTAL}$) is equal to a sum of the first capacitance of the first capacitor and a third capacitance of the third capacitor if the set gain is low. An effective input voltage ($V_{net}$) to the instrumentation amplifier is determined by:

$$V_{net} = (V_{in+} - V_{in-}) - \frac{C_{R_{TOTAL}}}{C_{IN_{TOTAL}}}(V_{ref+} - V_{ref-})$$

$V_{in+}$ is a voltage of the positive terminal of the input voltage. $V_{in-}$ is a voltage of the negative terminal of the input voltage. $C_{R_{TOTAL}}$ is a total capacitance of the first reference capacitor bank. $V_{ref+}$ is a voltage of the positive terminal of the reference voltage. $V_{ref-}$ is a voltage of the negative terminal of the reference voltage.

BRIEF DESCRIPTION OF THE DRAWINGS

FIG. 5A illustrates a schematic of a composite resistor to minimize a temperature coefficient, according to an aspect of the present disclosure.

FIG. 5B illustrates a graph illustrating a relationship between resistance and a temperature coefficient.

FIG. 7D illustrates a schematic of an example sensor interface for bridge readout with and without signal amplification, according to an aspect of the present disclosure.

FIG. 7E illustrates a schematic of an example sensor interface for using an internal pseudo-bridge for base signal cancellation, according to an aspect of the present disclosure.

FIG. 7F illustrates a schematic of an example sensor interface for single-ended voltage readout, according to an aspect of the present disclosure.

FIG. 7G illustrates a schematic of an example sensor interface for differential voltage readout, according to an aspect of the present disclosure.

FIG. 9A illustrates a schematic of an example CCIA with a chopper implementation, according to an aspect of the present disclosure.

FIG. 9B illustrates a schematic of a non-overlapping clock, according to as aspect of the present disclosure.

DETAILED DESCRIPTION

Figure 1:
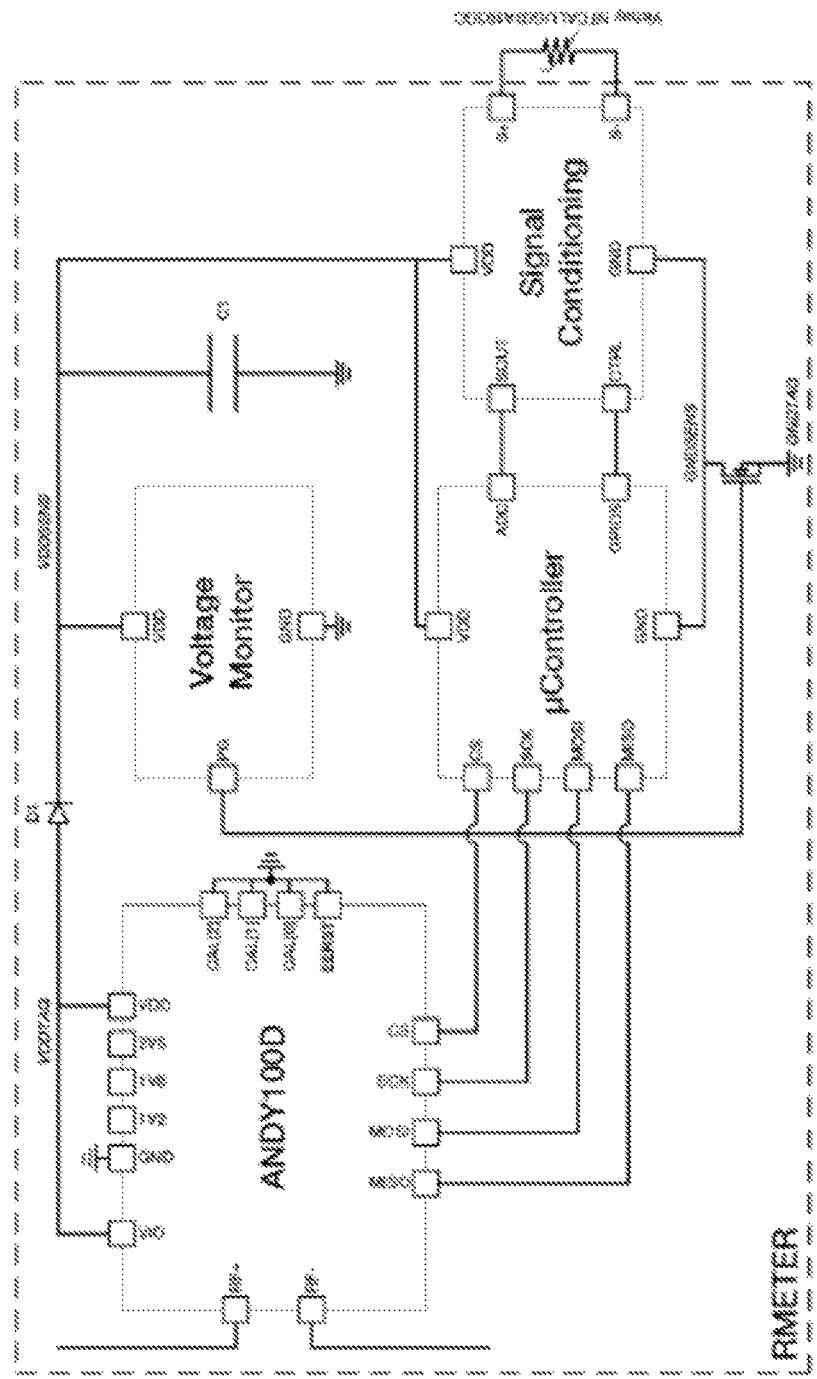
FIG. 1 illustrates a block diagram of an example prior art RFID tag with a digital data interface.

The present disclosure relates generally to converting analog sensor signals to digital sensor signals. More specifically, the present disclosure relates to RFID tags embedded with a sensor interface circuit, such as a CMOS sensor interface circuit. In at least some aspects, the provided RFID tag may include at least some of a pre-filter, a reconfigurable instrumentation amplifier, an analog-to-digital converter, an on-chip calibration scheme, and a digital controller.

Due to the noisy operation environment of RFID (surrounded with high-frequency noise), the interconnection of the wires between sensing devices and the RFID chip can pick up a great amount of high-frequency (HF) noise, which would greatly deteriorate the signal and interface performance. In some aspects, the pre-filter may be inserted right after the interconnection between the sensor and the interface circuits to perform HF attenuation. In some aspects, after signal filtering, a reconfigurable instrumentation amplifier (IA) may be added. This IA may be bypassed and disabled if signal amplification is not required, in some instances. For example, during direct voltage signal conversion, this IA is disabled. In such an example, the IA consumes no power and it would not introduce noise or other nonidealities into the sensing signals. If signal amplification is required, the gain of the IA can be configured via internal registers. In at least some aspects, a startup scheme is added to decrease the startup time of the IA to achieve energy savings. Additionally, in various examples, a pseudo-bridge scheme using capacitor-DAC (CDAC) is used to cancel the base voltage in the input. In this way, the interface can mimic a Wheatstone bridge without using extra precise resistors. In some instances, this CDAC may also be bypassed if it is not needed. In this way, for resistance measurement, the input configuration is more flexible. In addition, various aspects of this IA may be designed in three voltage domains where the input stage is supplied by a low supply voltage for further energy savings.

In at least some aspects, following the IA, an incremental delta-sigma analog-to-digital converter (A/D) may be used to quantize the amplified/passed signals. The reference voltage of this A/D may be selected from either external reference, external resistor-generated voltage, or temperature dependent voltage. The input signals of the A/D may be selected from the bypassed input, amplified input, DAC voltage, or may be tied to ground. With this flexibility, the A/D can achieve different conversion target, including calibration, temperature compensation, etc. In the digital controller of the A/D, system chopping, and device dynamic element matching may be used, in various aspects, to minimize the system offset, noise, and nonlinearities. Additionally, to avoid malfunction when a large instantaneous error occurs in the RF environment, an on-chip data verification scheme may be added in various aspects to ensure valid conversion.

In various examples, after signal conditioning and quantization, the derived digital signal may be transferred to the baseband of the RFID tag for data transmission. In some aspects, a robust data handshaking scheme may be designed to avoid transient glitch induced erroneous data capturing.

In some aspects, CMOS-compatible sensor(s) can be integrated on the same substrate of the RFID tag and can utilize noise averaging, time-domain sensing, and the like to achieve relatively good resolution and precision. For sensors that are not CMOS-compatible, like acceleration, humidity, strain, etc., a sensor interface that is low power and can fit most of the sensor types is required. FIG. 1 shows a block diagram of a prior art RFID tag chip that embeds digital Serial Peripheral Interface (SPI) interfaces to connect with other fully digital sensors. However, this system greatly degrades the sensitivity of the RFID as the digital sensors are not fully optimized and should be fully powered by the RFID tag. In this case, analog sensor interface is preferred as the interface circuits can be optimized in the platform. Such an integration also allows system level co-design, such as sharing the system clock and digital controller to achieve further power savings.

Figure 2:
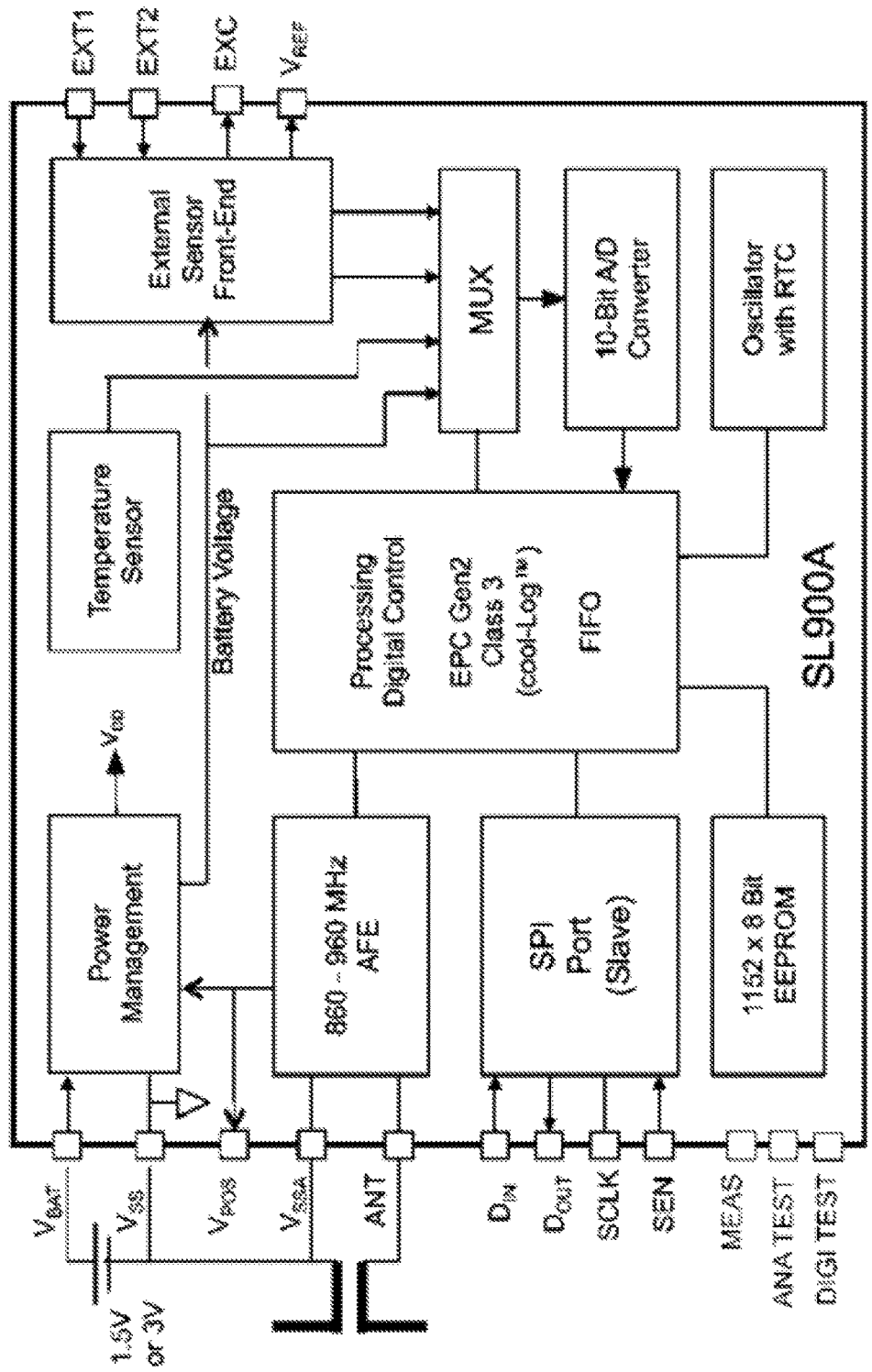
FIG. 2 illustrates a block diagram of an example prior art RFID tag with a digital and an analog data interface.

FIG. 2 shows a block diagram of a prior art RFID tag chip with a digital and analog interface that can interface to a limited type of analog sensors. However, the circuits and systems are not optimized, no features like filtering, amplification are available, and has a power consumption as high as 100s' uW. It in most cases can only operate with the assistant of an external battery. This greatly increases its feature size, cost, and limits its applicable scenarios (e.g., no batteries are allowed in the industrial system like power grid monitoring). As a result, more intelligent sensor interface designs that can be embedded in the passive RFID platform is required to enable future wireless sensing applications.

Figure 3A:
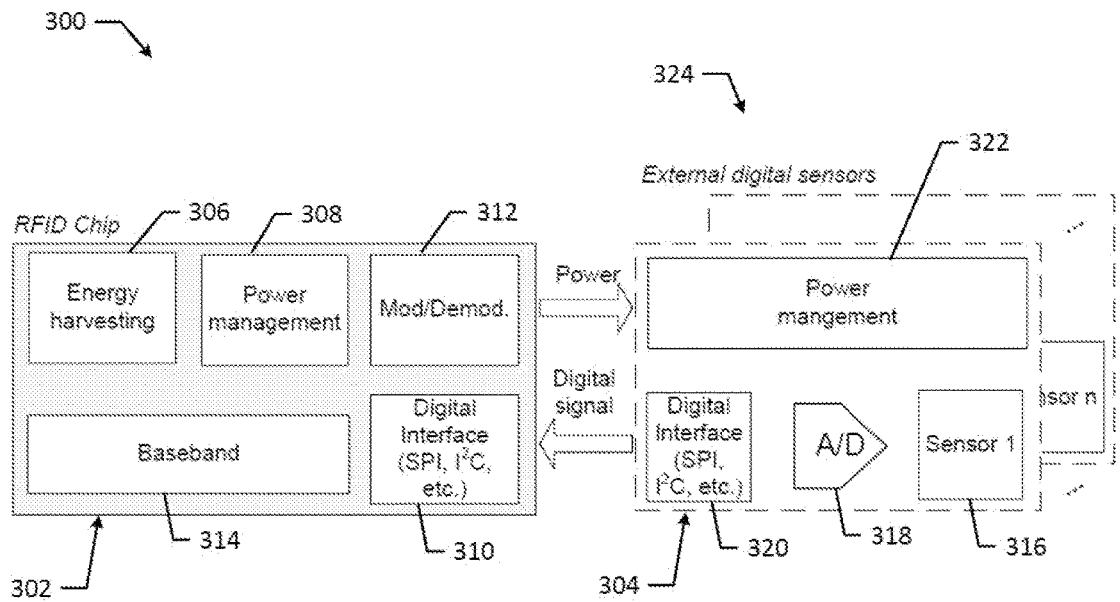
FIG. 3A illustrates a block diagram of an example passive RFID tag with a digital interface, according to an aspect of the present disclosure.
Figure 3B:
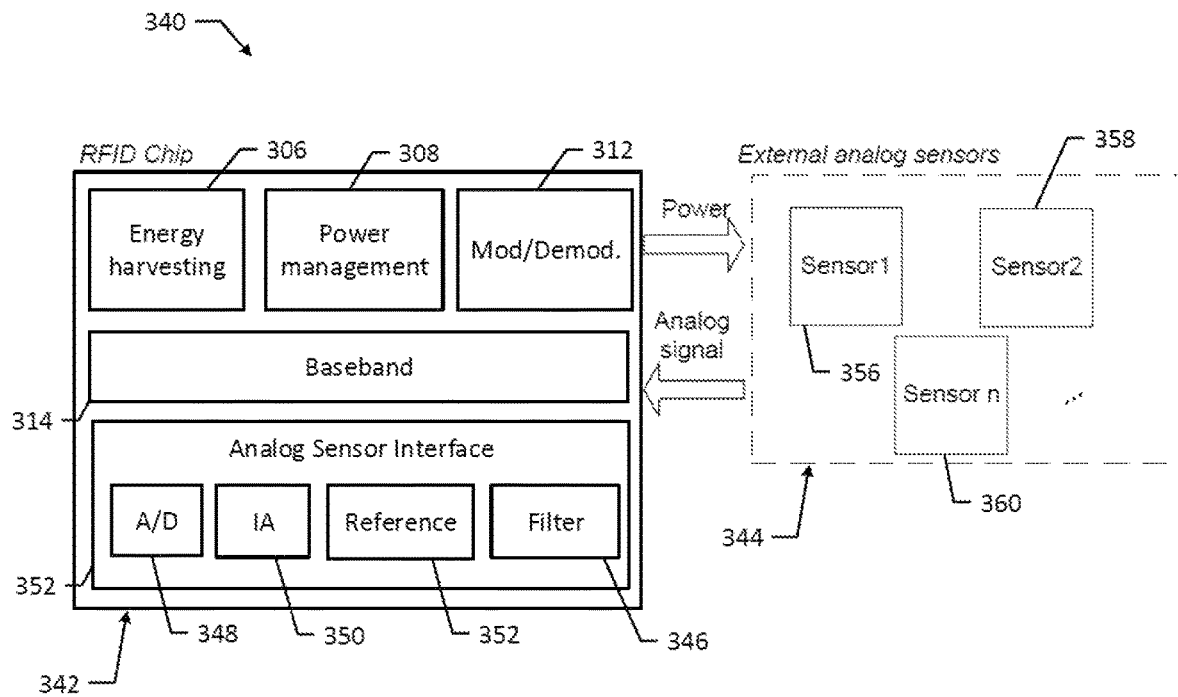
FIG. 3B illustrates a block diagram of an example passive RFID tag with an analog interface, according to an aspect of the present disclosure.

The present disclosure provides a sensor interface for voltage, resistance, and current type sensor readout. FIGS. 3A and 3B show block diagrams of two different interface systems for RFID of the present disclosure. FIG. 3A shows a block diagram of an example interface system 300 including an RFID chip 302 embedded with a digital sensor interface 310 for interfacing with an external digital sensor circuit 304 including a sensor 316. In at least some aspects, the interface system 300 includes a set 324 of multiple digital sensor circuits 304 (i.e., sensor 1 . . . sensor n). Each digital sensor circuit 304 in the set 324 requires its own digital sensor interface 310 on the RFID chip 302, which can heavy load the RFID tag and reduce the sensing sensitivity of the RFID tag. In some aspects, a digital sensor circuit 304 may include a digital interface 320 that connects the digital sensor circuit 304 to the RFID chip 302. The digital interface 320 may, for example, be an SPI, an Inter-Integrated Circuit ($I^2C$), etc. In some aspects, a digital sensor circuit 304 may include an analog-to-digital (A/D) converter 318. In some aspects, a digital sensor circuit 304 may include a power management block 322 that generates power for other blocks in the digital interface circuit 304. As will be appreciated, the digital sensor circuit 304 may directly convert a signal measured by the sensor 316 into digital signal output within the digital interface circuit 304 itself. And the digital signal output may be transmitted to the RFID chip 302 digitally.

In some aspects, the provided RFID chip 302 may include an energy harvesting block 306. During operation, the energy harvesting block 306 can rectify the incoming high frequency wave from an RFID reader and store the received energy in an on-chip energy storage capacitor. The power management unit 308 of the example RFID chip 302 may generate several cleaner power supplies for other circuit blocks. The command from the RFID reader may be interpreted by the modulator/demodulator 312 and fed to the baseband 314 for the requested operation (e.g., sensing). After data conversion, the baseband 314 may feed the derived digital output to the modulator/demodulator 312 and the information can be transmitted back to the reader using a backscattering mechanism (e.g., impedance modulation). In some aspects, the RFID chip 302 may include a digital interface 310 that connects the RFID chip 302 to the one or more digital sensor circuits 304. The digital interface 310 may, for example, be an SPI, an Inter-Integrated Circuit ($I^2C$), etc. The interconnection between the one or more digital sensor circuits 304 and the RFID chip 302 via the digital interface 310 includes power, data, and control signal, which will be described more below.

FIG. 3B shows an example interface system 340 for an RFID tag including an RFID chip 342 embedded with an analog sensor interface 352 for interfacing with one or more analog sensors 356, 358, 360. Examples of analog sensors 356, 358, and 360 include accelerometers, pressure sensors, light sensors, sound sensors, temperature sensors, etc. The analog interface 344 enables reading the analog sensors 356, 358, and 360. The analog interface 344 enables the same number of sensors 356, 358, 360 to be read while only one analog sensor interface 352 is required, as compared to the digital interface circuit 304. The interface circuit 344 can be multiplexed between all the analog sensors 356, 358, 360 for data conversion. In this way, the feature size, sensing sensitivity, cost, as well as robustness of the whole interface system 340 is improved when deployed at a large scale for wireless sensing network.

The example RFID chip 342 in the interface system 340 may include an energy harvesting block 306, a power management unit 308, a modulator/demodulator 312, and a baseband 314 as described above for the RFID chip 302. The interconnection between the interface circuit 344 and the RFID chip 342 includes power, data, and control signal, which will be described more below. For instance, the RFID chip 342 may include a filter 346, an A/D converter 348, an instrumentation amplifier (IA) 350, and/or an on-chip temperature compensated resistor as a resistance reference 352.

Figure 4:
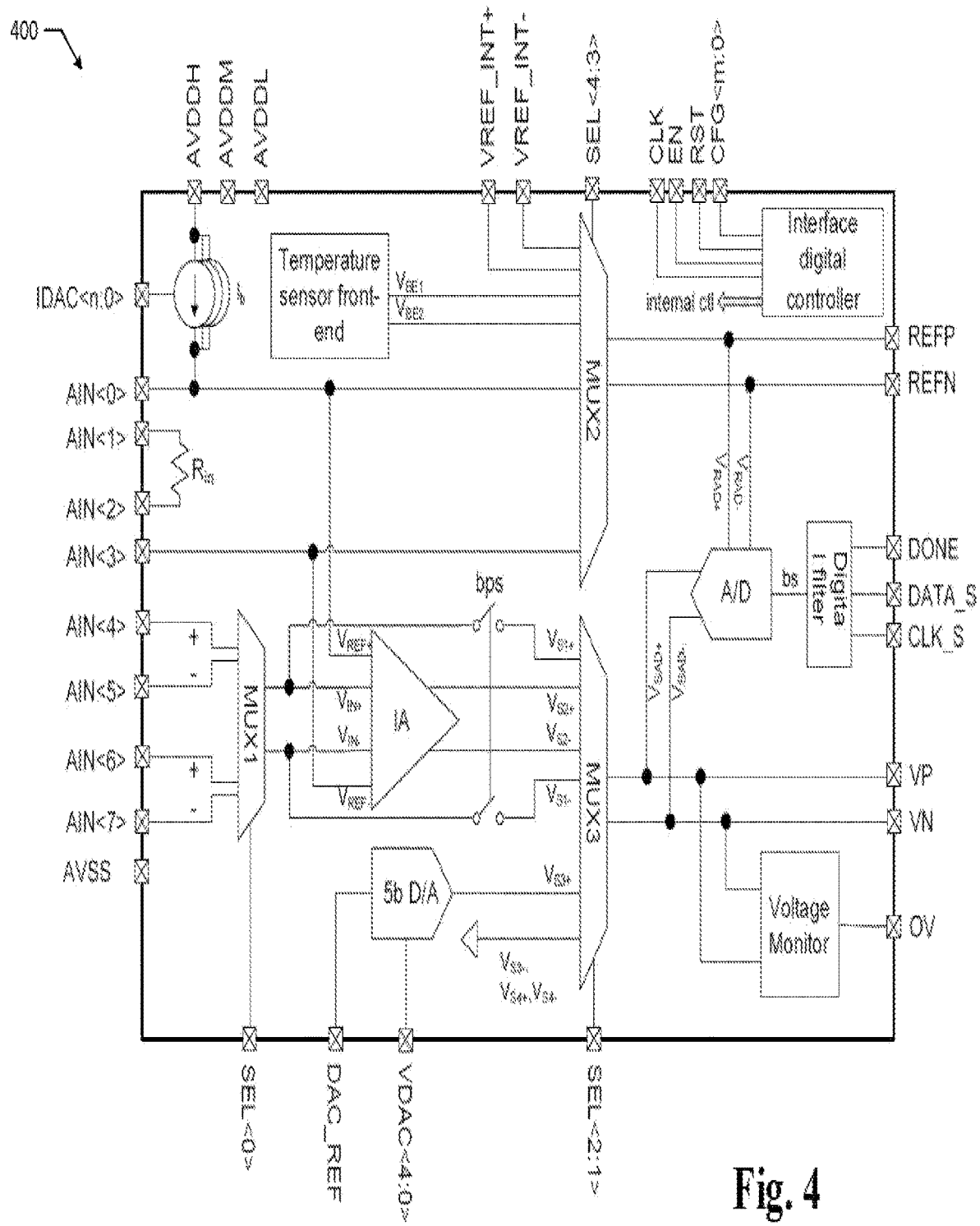
FIG. 4 illustrates a schematic circuit diagram of an example sensor interface, according to an aspect of the present disclosure.

FIG. 4 illustrates a schematic circuit diagram of an example sensor interface 400. In various examples, the sensor interface 400 may be implemented on an RFID chip, such as the RFID chip 302 or the RFID chip 342. In various aspects, the sensor interface 400 may include the I/O ports, the interconnection of the sensor interface 400 with the tag system including the RFID chip, as well as the individual functional blocks. In various aspects, such as the illustrated one, eight analog input pins AIN<0> to AIN<7> may be used to interface with external sensing devices. Here, AIN<0> to AIN<3> is an input pair, AIN<4> and AIN<5> is an input pair, and AIN<6> and AIN<7> is an input pair. In this example, AIN<1> and AIN<2> connect to an internal 12.5 Kohm temperature compensated composite resistor. This resistor can be used as a reference resistor if the external precision resistor is not available or cannot be embedded into the application system. In some aspects, the sensor interface 400 may also include 10 bias current sources connected to AIN<0>, which will be used to develop voltages if a resistive path exists from AIN<0> to AVSS. A multiplexer MUX1 may be controlled to select the input pair for signal conversion. An instrumentation amplifier (IA) (e.g., the IA 800 in FIG. 8), which can be bypassed, may be used to amplify the input without deteriorating the signal.

In some aspects, a pseudo-bridge configuration may also be included in the provided IA (e.g., IA 800 in FIG. 8) design to mimic an external Wheatstone bridge for base signal cancellation. A bandgap reference block is used to generate on-chip bias signals. It may also generate two voltage signals VBE1, VBE2 for temperature sensing. A 5 bit DAC is used to perform calibration by feeding a precise off-chip reference voltage DAC_REF to the sensor interface 400. Before the analog to digital converter (A/D), two multiplexers may be used to select the input and the reference signals used for conversion. In at least some aspects, MUX2 controlled by SEL<4:3> hereof may select one of the three reference signals, the voltage across AIN<0> to AIN<3>, $V_{BE1}/V_{BE2}$, or VREF_INT+/VREF_INT−. In at least some aspects, MUX3 controlled by SEL<2:1> may select one of the three input signals, the output of the IA, bypassed input from the input, or $V_{DAC}$/AVSS. To ensure the validation of the input signals, an over-range detection circuit (e.g., Voltage Monitor) may be added in some examples. In some instances, an OV is set if the selected input signal is above (below) the maximum (minimum) allowed input range of the A/D. An interface digital controller block following the A/D may process the digital output bitstream of the A/D to generate a Done signal once the conversion is finished. Serial data DATA_S may be captured by the baseband of the tag with the assist of the serial shift clock CLK_S. In various aspects, all the other required digital control signals may be generated by the digital controller of the sensor interface 400.

FIG. 5A shows a schematic of an example composite resistor $R_{in}$ to minimize a temperature coefficient. FIG. 5B shows a graph illustrating a simulated relationship between resistance and a temperature coefficient of the composite resistor $R_{in}$ in FIG. 5A, which composes N+ Poly resistor r1, r4 and N+ diffusion resistor r2, r3. Their temperature coefficient (TC) difference compensates each other to achieve minimal resistance drift. Other examples are also feasible as long as the TC of the final composite resistor is minimized to 10's of ppm level, which is good enough (e.g., 14 bit precision) to be used as resistance reference. The TC of the example resistor $R_{in}$ is stable at different process corners.

Figure 6:
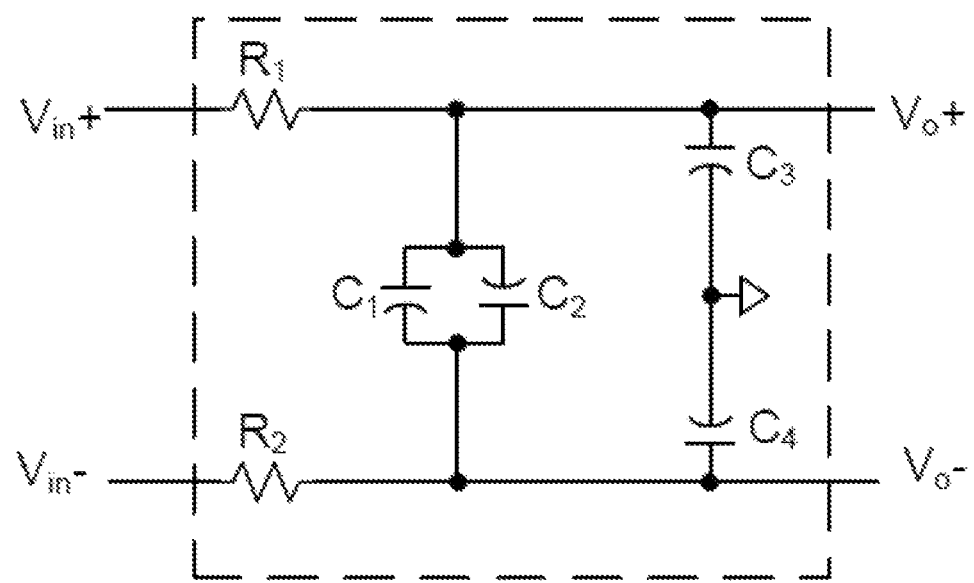
FIG. 6 illustrates a schematic of passive pre-filtering to attenuate RF noise, according to an aspect of the present disclosure.

For RFID, since it is sustained via external HF RF signal, when interfacing sensors with the RFID chip or platform, the interconnection wires and connectors can pick up strong HF noises (from the reader or from other noise sources). This noise affects the operation of the internal circuits. To minimize this effect, in some aspects, pre-filters may be added in the I/O pairs (pair AIN<0> to AIN<3>, pair AIN<4> and AIN<5>, pair AIN<6> and AIN<7>). FIG. 6 shows an example pre-filter design 600, which includes both common mode (CM) signal filtering with R1, R2, C3, C4 and differential mode (DM) signal filtering with R1, R2, C1, C2. For ultra-high frequency (UHF) RFID, the operation frequency is 860 MHz~960 MHz. In some examples, the attenuation strength at 900 MHz is 60 dB. Other attenuation can be achieved by changing the value of R1-R2, C1-C4. In some examples, the two end-to-end connected capacitors C1 and C2 are used to balance the parasitic capacitance associated with the two input paths.

Figure 7A:
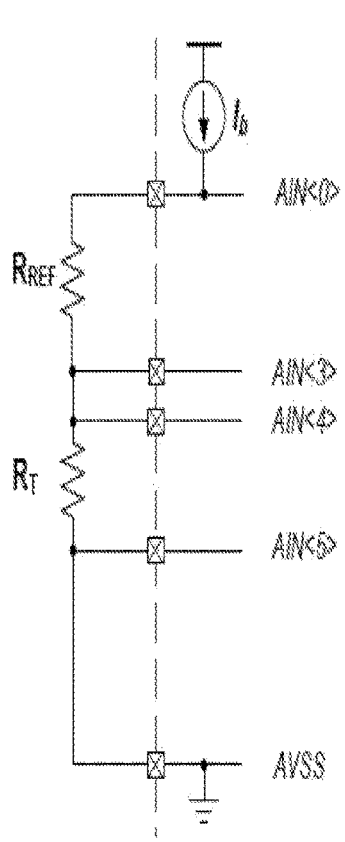
FIGS. 7A, 7B, and 7C illustrate a schematic of an example sensor interface for a resistive sensor readout without signal amplification, according to an aspect of the present disclosure.
Figure 7B:
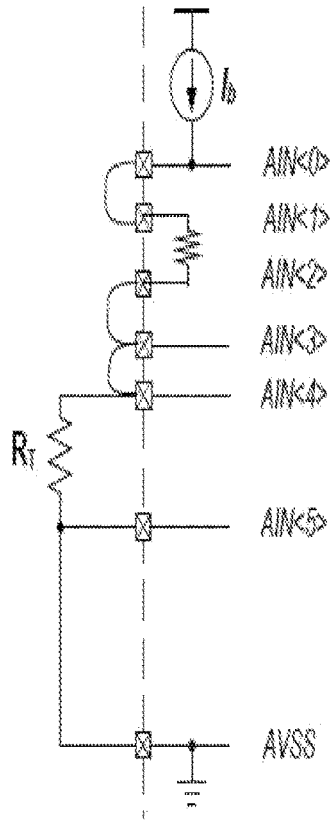
Figure 7C:
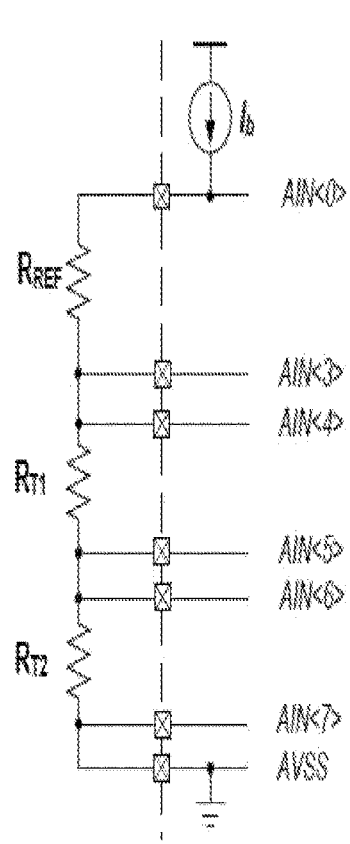

FIGS. 7A to 7H show example connections of a provided sensor interface with external resistive/voltage/current type sensors/signals. FIGS. 7A, 7B, and 7C each show a schematic of an example sensor interface 700, 710, 720, respectively, for a resistive type sensor readout without signal amplification. For a resistive sensor readout, an external reference resistor RREF can be used to develop a reference voltage RREF*Ib, the corresponding input voltage for the A/D is RT*Ib after quantization, and the unknown sense resistor RT may be calculated using the digital output Do, according to the relationship RT=$D_o$*RREF. In addition, the internal resistor Rin can also be used to replace RREF to minimize the overall system's feature size. Meanwhile, two unknown resistive sensors can be connected to the interface via AIN<4:5> and AIN<6:7>, their values can be read out by multiplexing the input multiplexer.

FIG. 7D shows a schematic of an example sensor interface 730 for bridge readout with and without signal amplification. For bridge readout, in various aspects, if no on-chip amplification is needed, the corresponding input signal to the A/D is:

$$\frac{R*Ib}{1+\frac{4R}{R_T-R}} \approx \frac{R_T-R}{4}*Ib.$$

After quantization, the unknown sense resistor RT can be calculated using the digital output $D_o$ by the relationship $R_T=4D_o$*$R_{REF}$+R. In this case, if signal amplification is used, the gain of the IA should be used to calculate the final input resistance, with the amplifier gain being $A_S$, by the relationship:

$$R_T = \frac{4D_D*R_{REF}}{As} + R.$$

FIG. 7E shows a schematic of an example sensor interface 740 for using an internal pseudo-bridge for base signal cancellation. In some aspects, three precisely matched resistors may be utilized to form a Wheatstone bridge (e.g., as shown in FIG. 7D). For many sensors, their signals are weak and must be amplified before quantization. Without using the Wheatstone bridge, the amplifier would get saturated by the large base signals. In some aspects, alternative to the Wheatstone bridge, the present disclosure provides a pseudo-bridge, which will be described in more detail below. By enabling the pseudo-bridge, the net input signal to the IA is determined as $V_{IN}=R_T$*Ib–$A_F$*$R_{REF}$*Ib. Here, $A_F$ is the gain of the pseudo-bridge, which can be controlled by a capacitive bank. In this way, by estimating the ratio of $R_T/R_{REF}$, $A_F$ can be configured and the net input to the IA can be minimized even as the sensors are at their neutral states (baseline). After quantization, the target sensor resistance (or other signals) can be calculated by:

$$R_T = \frac{D_o*R_{REF}}{As} + A_F R_{REF}.$$

FIGS. 7F and 7G show a schematics of an example sensor interface 750 for single-ended voltage readout and an example sensor interface 760 for differential voltage readout, respectively. In various aspects, for single-ended and differential voltage readout, the input voltage is fed directly to the A/D. Based on the reference voltage pair used by the A/D, in various aspects, the unknown input voltage can be calculated as $V_T=D_o V_{REF}$.

Figure 7H:
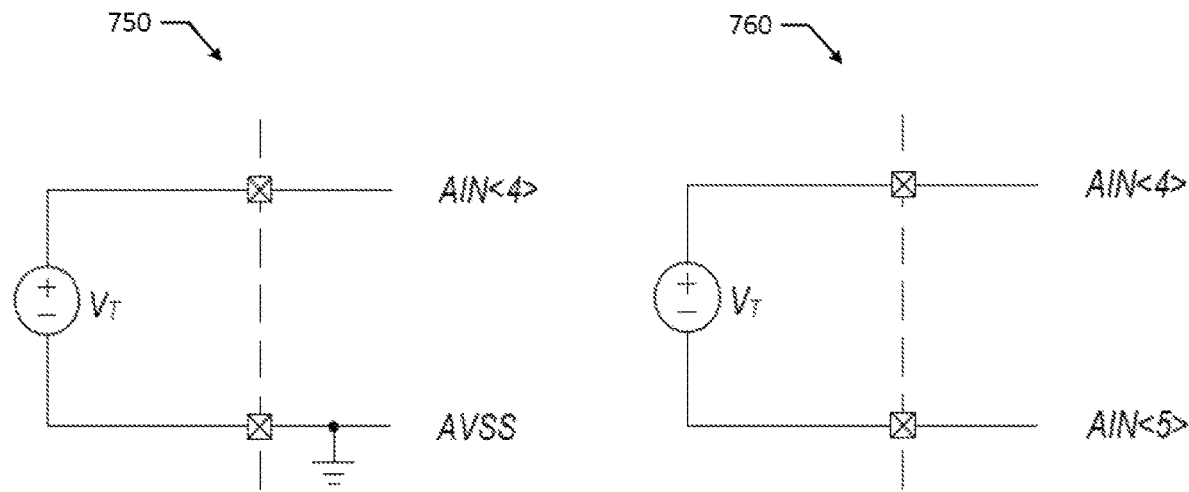
FIG. 7H illustrates a schematic of an example sensor interface for current type sensor readout, according to an aspect of the present disclosure.
Figure 7H:
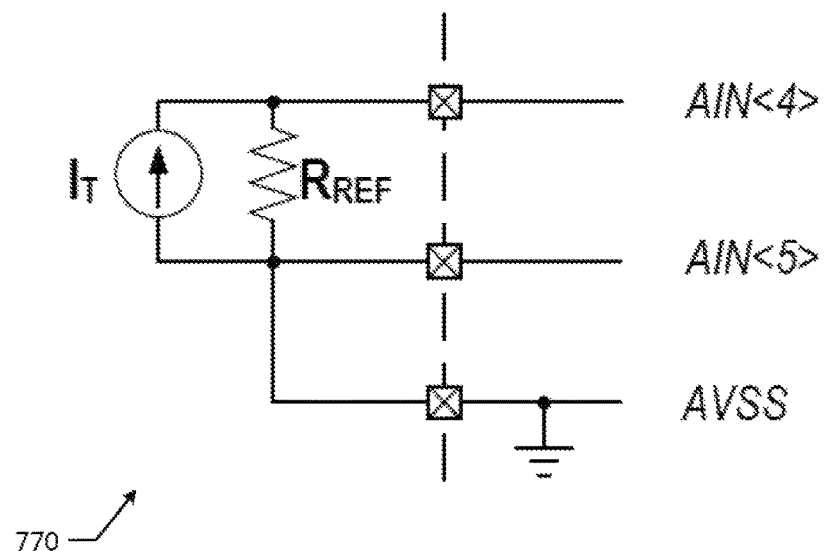

FIG. 7H shows a schematic of an example sensor interface 770 for current type sensor readout. For current type sensor readout, in various aspects, a reference resistor $R_{REF}$ is used to convert the unknown sensing current $I_T$ to a voltage signal. Similarly, based on the reference voltage pair used by the A/D, the unknown input current can be calculated by:

$$I_T = \frac{D_o V_{REF}}{R_{REF}}.$$

Figure 8:
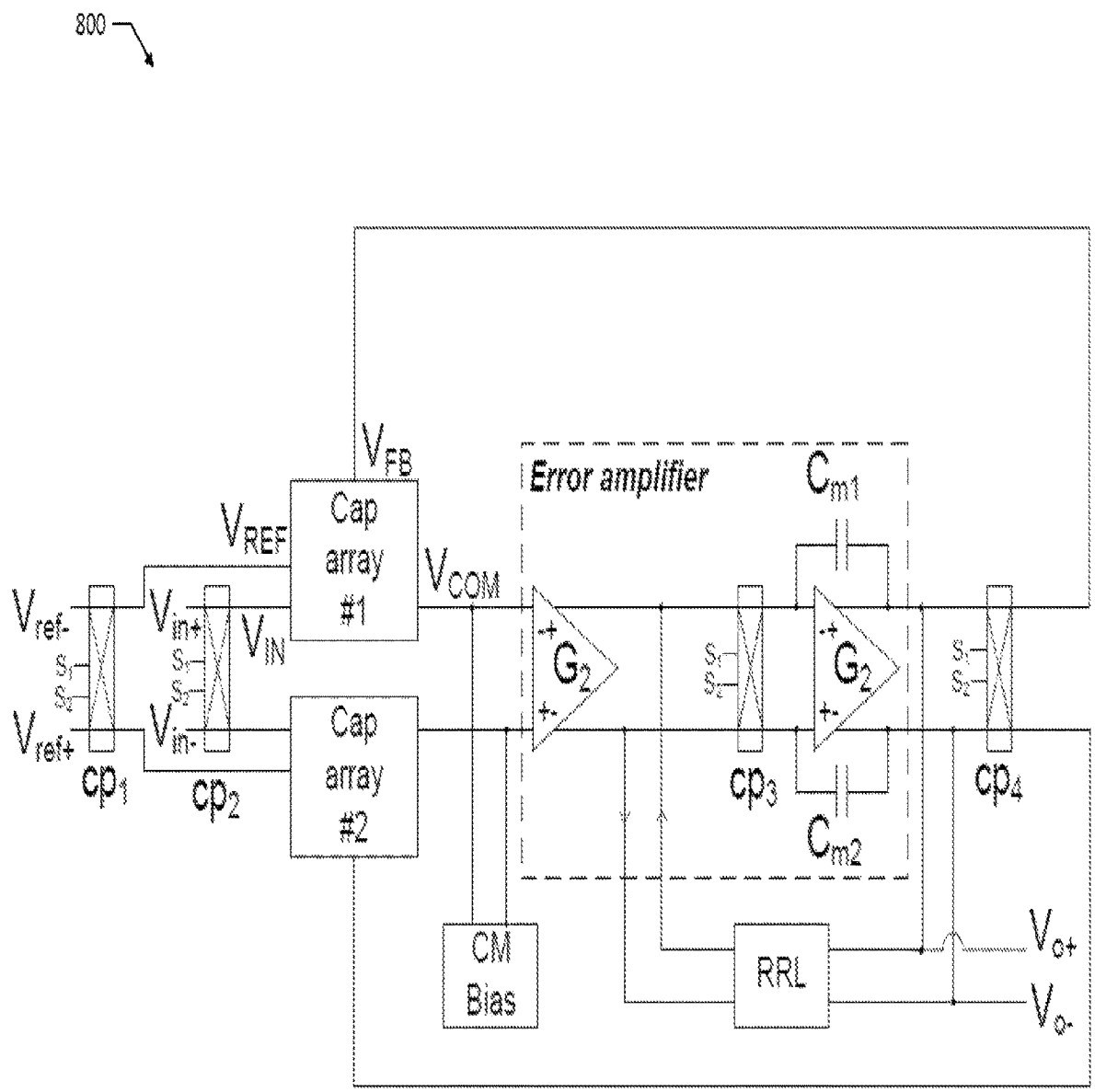
FIG. 8 illustrates a block diagram of an example capacitively-coupled instrumentation amplifier (CCIA), according to an aspect of the present disclosure.

FIG. 8 illustrates the topology of an example instrumentation amplifier (IA) 800. In various aspects, the topology of the example IA 800 utilizes a capacitively-coupled instrumentation amplifier (CCIA) core. The operation principle of CCIA is appreciated by one of skill in the art. In at least some aspects, the capacitive coupling is achieved by chopping the input and feedback signals using choppers cp1 to cp4 which are driven by the same control clocks. A schematic implementation of a chopper cp1, cp2, cp3, or cp4 is shown in FIG. 9A, which is driven by a non-overlapping clock, a schematic of which is illustrated by FIG. 9B.

Figure 9C:
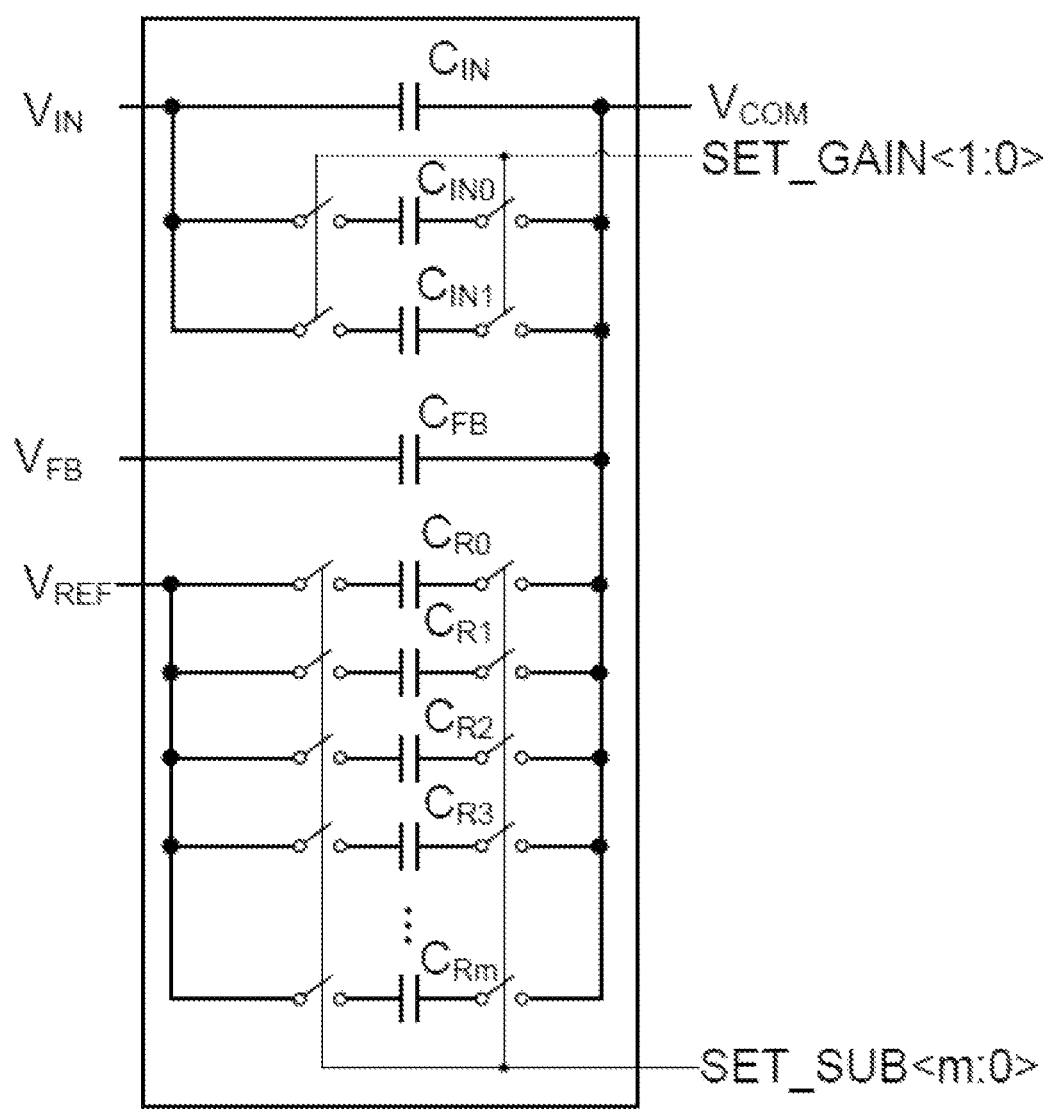
FIG. 9C illustrates a schematic of an example CCIA with a cap array implementation, according to an aspect of the present disclosure.

The topology of the IA 800 helps enable greater performance for the IA 800 (e.g., power consumption and settling behavior), as compared to typical IA designs, that enables the sensor interface 400 to be embedded into an RFID platform. In the provided topology design of the IA 800, the input $V_{IN+}/V_{IN-}$ is amplified by the gain determined by the ratio of $C_{IN\_TOTAL}/C_{FB}$, as shown in FIG. 9C, wherein $C_{FB}$ is feedback capacitance and $V_{FB}$ is feedback voltage. Here, $C_{IN\_TOTAL}$ is determined by SET_GAIN<1:0>. If SET_GAIN<1> is HIGH, $C_{IN1}$ is added to $C_{in}$ and $C_{IN\_TOTAL}=C_{IN}+C_{IN1}$. If SET_GAIN<0> is HIGH, $C_{IN0}$ is added to $C_{IN}$ and $C_{IN\_TOTAL}=C_{IN}+C_{IN0}$. Meanwhile, to achieve base signal cancellation (e.g., the provided pseudo-bridge), a capacitor bank $C_{R0}$~$C_{Rm}$ controlled by SET_SUB<m:0> is added. As shown in FIG. 8, if a nonzero voltage is added between $V_{ref+}/V_{ref-}$, this voltage will be subtracted (due to opposite positioning of the terminals) from the input $V_{in+}/V_{in-}$ following a radiometric manner and the effective input to the IA is determined by:

$$V_{net} = (V_{in+} - V_{in-}) - \frac{C_{R_{TOTAL}}}{C_{IN_{TOTAL}}}(V_{ref+} - V_{ref-})$$

Here $C_{R\_TOTAL}$ is the total enabled capacitance of $C_{R0} \sim C_{Rm}$. In this manner, the base voltage in $V_{in+}/V_{in-}$ can be cancelled without adding a Wheatstone bridge and without using precisely matched external resistors to achieve low-cost application.

Figures 9D, 9E:
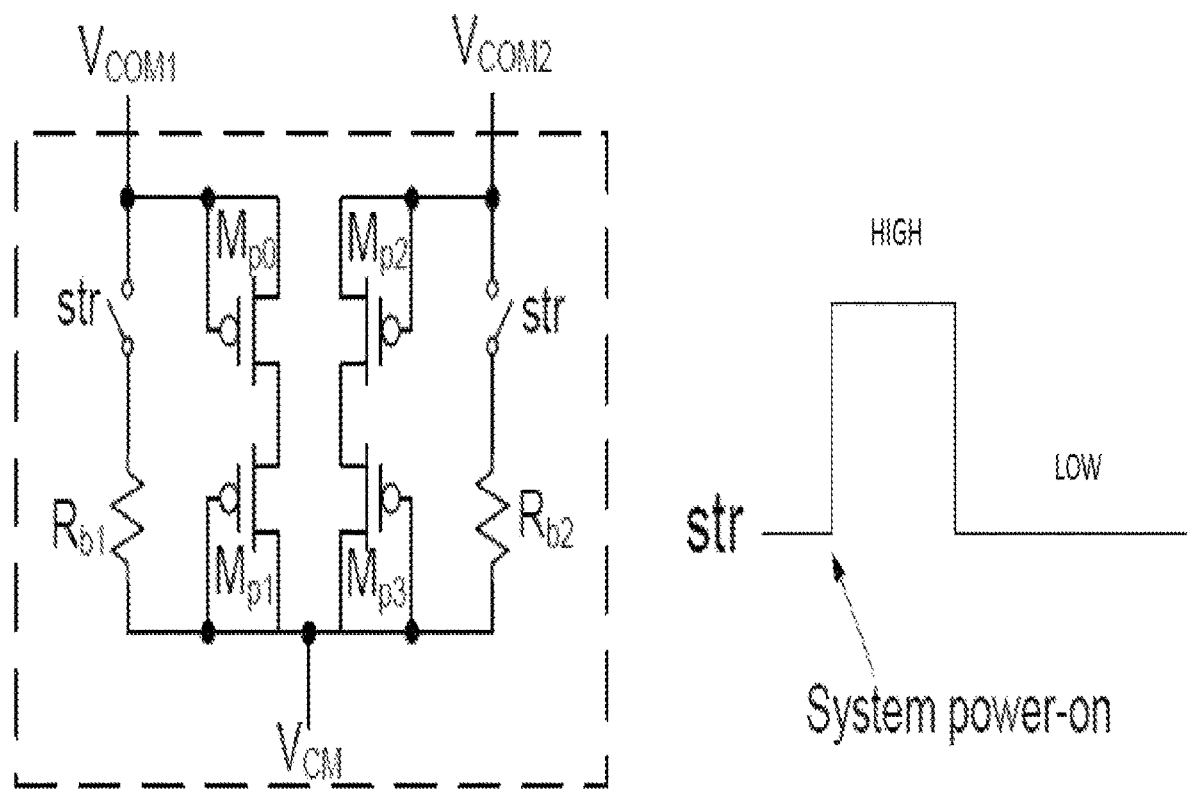
FIG. 9D illustrates a schematic of an example CCIA with a common mode bias block implementation, according to an aspect of the present disclosure.
FIG. 9E illustrates a line graph of str in conjunction with the start-up scheme shown in FIG. 9D, according to an aspect of the present disclosure.

In at least some aspects, to embed the whole system into a passive RFID platform, the energy consumption for each data sample must be minimized to maintain a high sensitivity of the tag. Typically, the system operates in transient mode or operates discontinuously. The start-up time of the sensor interface, during which the energy is wasted, must be minimized in various aspects. In some examples of the present disclosure, a start-up assisting scheme may be added to decrease the overall startup time of the IA. As shown in FIG. 9D, in some aspects, a pseudo-resistor formed by two diode-connected PMOS ($M_{p0}$ and $M_{p1}$) may be used as a regular bias resistor (Giga-ohm level), which can maintain the voltage at nodes $V_{COM1}$ and $V_{COM2}$ at the desired common mode voltage level. Additionally, small resistors $R_{b1}$, $R_{b2}$ (100's of kilo-ohm) and respective transmission gates controlled by str may be added. During startup, str is HIGH (FIG. 9E) and the equivalent resistance at nodes $V_{COM1}$ and $V_{COM2}$ are $R_{b1}$ and $R_{b2}$, respectively, which minimizes the common mode time constant at the error amplifier inputs to allow a fast startup. Once $V_{COM1}$ and $V_{COM2}$ approach the desired voltage, str becomes LOW (FIG. 9E) and $R_{b1}$ and $R_{b2}$, which have larger current noise, are not connected to the IA to minimize the CM bias induced noise. Accordingly, the provided start-up scheme may speed up the startup process of the IA but does not introduce additional noise to the circuit.

Figure 9F:
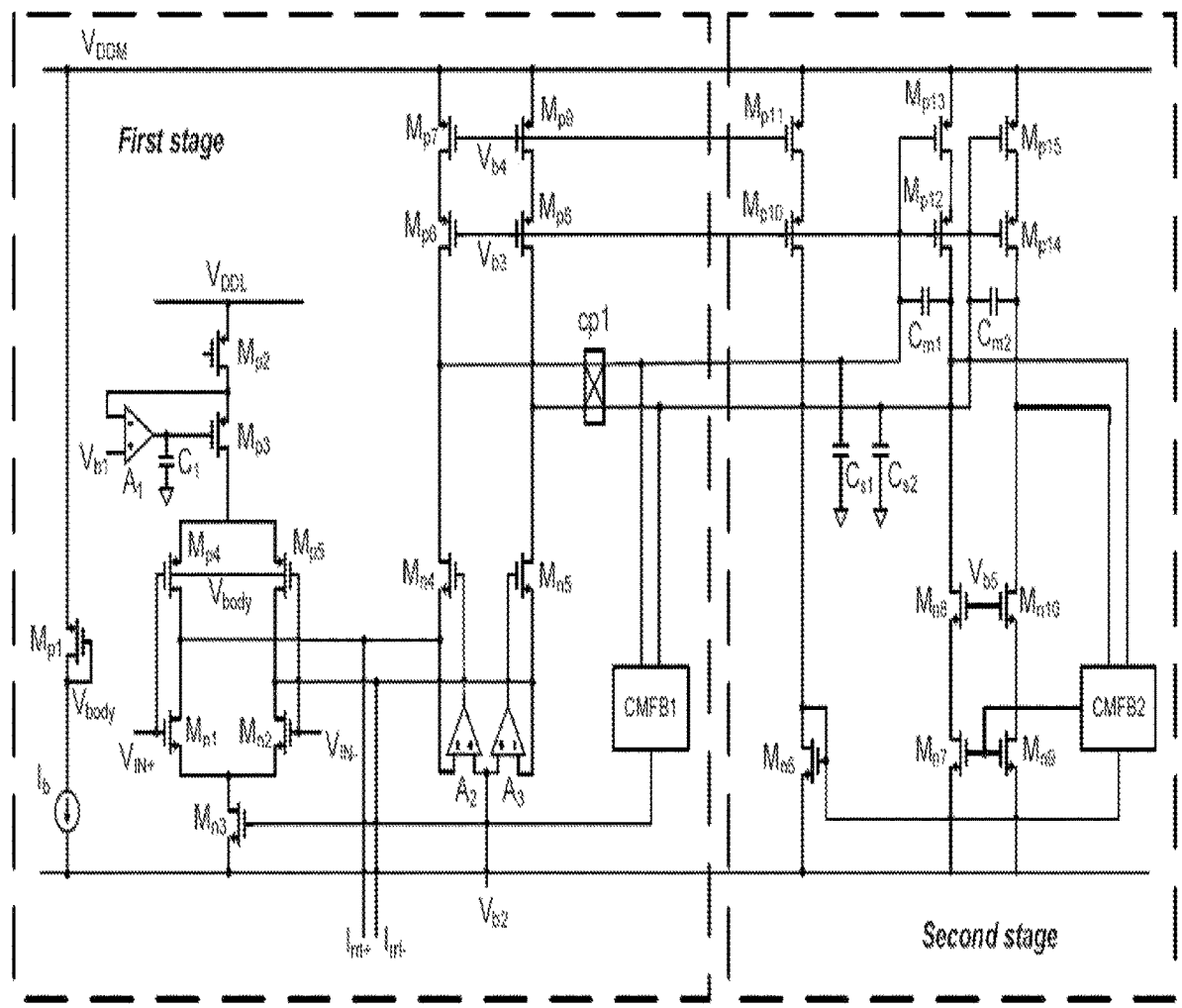
FIG. 9F illustrates a schematic of an example CCIA with an error amplifier implementation, according to an aspect of the present disclosure.

FIG. 9F illustrates a schematic of an example configuration of an error amplifier 900. As compared to a typical design, the example configuration provides a dual-supply low noise, low power architecture for the error amplifier 900 which is robust at different corner and operation temperatures. In at least one example, the error amplifier 900 is a two-stage amplifier using the well-known Miller compensation for system stabilization. Three supplies (VDDH, VDDM, VDDL) may be used. In at least some aspects, the first stage uses an improved current reused folded-cascode topology. In such aspects, $M_{n1,2}$, $M_{p4,5}$ form the input pair. By feeding input to both NMOS and PMOS transistors, the input transconductance ($g_m$) can be maximized given the same current level, thus minimizing the overall amplifier noise. Since the bias current of this transistor pair dominates the total current consumption of the error amplifier, to minimize the overall power, a low supply voltage (down to 0.5V) VDDL may be used for this input pair, in various aspects. However, a normal NMOS, PMOS pair will not function under this constraint. In this example configuration, $M_{n1,2}$ are native transistors, $M_{p4,5}$ are low-$V_{th}$ transistors. The input common mode voltage is designed to be zero, at least some aspects.

In various examples, to keep the input pair in the operation region, two amplifiers $A_2$ and $A_3$ may be added to regulate the drain voltage of $M_{n1,2}$ to be $V_{b2}$. Meanwhile, a regulated cascode current mirror consisting of $M_{p2,3}$, $A_1$, and a compensating capacitor $C_1$ may be used to maintain a stable bias from VDDL. At high temperatures and/or slow device corner, $V_{th}$ of the devices would drop to their minimum value. In order for the amplifier to operate within a wide temperature and process range, a PMOS substrate bias $V_{body}$ may be used, in various aspects, to modulate the $V_{th}$ of $M_{p4,5}$. When $V_{th}$ is low, $V_{body} = V_{DDM} - V_{gsMp1}$ is high, which in turn increases the effective $V_{th}$ of $M_{p4,5}$, making them to be more robust again temperature and process variations. $M_{n4,5}$, $M_{p6-9}$ are a typical output stage of the folded-cascode amplifier.

In various aspects, the first stage and the second stage of the error amplifier 900 is supplied by a median voltage VDDM to achieve larger output signal swing. In some instances, all the control signals in the example error amplifier 900 are supplied by a high supply voltage VDDH. In this way, the provided error amplifier 900 achieves a multi-voltage domain design to ensure a low power design without sacrificing the signal swing.

In at least some aspects, the output CM voltage of the first stage is controlled by CMFB1 and $M_{n3}$, where $M_{n3}$ operates in its near-linear region (small drain-source voltage $V_{DS}$) to achieve low voltage operation of the first stage. In at least some aspects, the second stage of the amplifier is a class-A topology, with PMOS $M_{p13,15}$ as the input pair and $M_{n7,9}$ providing the bias current. To further maximize the gain of the amplifier, $M_{p12,14}$ and $M_{n8,10}$ can be used for a cascode structure in some examples. The output common mode voltage is regulated by CMFB2, with $M_{n6}$ providing the nominal output bias current. To stabilize the amplifier, typical Miller compensation is used ($C_{m1,2}$) may be used. Different from other typical implementations, two capacitors $C_{s1}$ and $C_{s2}$ may be added to provide a high-frequency signal path, in various aspects, which helps maintain the phase margin of the error amplifier 900 at the HF band.

In the example configuration of the error amplifier 900, $A_1$, $A_2$, and $A_3$ are all single-ended PMOS input-pairs and NMOS current mirror loaded amplifier. In various aspects, CMFB1 is based on difference amplifier topology while CMFB2 is based on switch capacitor topology, which are topologies known in the art. In one aspect, the ripple reduction loop (RRL) block of the error amplifier 900 is similar to that described in Q. Fan, F. Sebastiano, J. H. Huijsing and K. A. A. Makinwa, "A 1.8 uW 60 nV√HZ Capacitively-Coupled Chopper Instrumentation Amplifier in 65 nm CMOS for Wireless Sensor Nodes," IEEE Journal of Solid-State Circuits, vol. 46, no. 7, pp. 1534-1543, July 2011.

Figure 10:
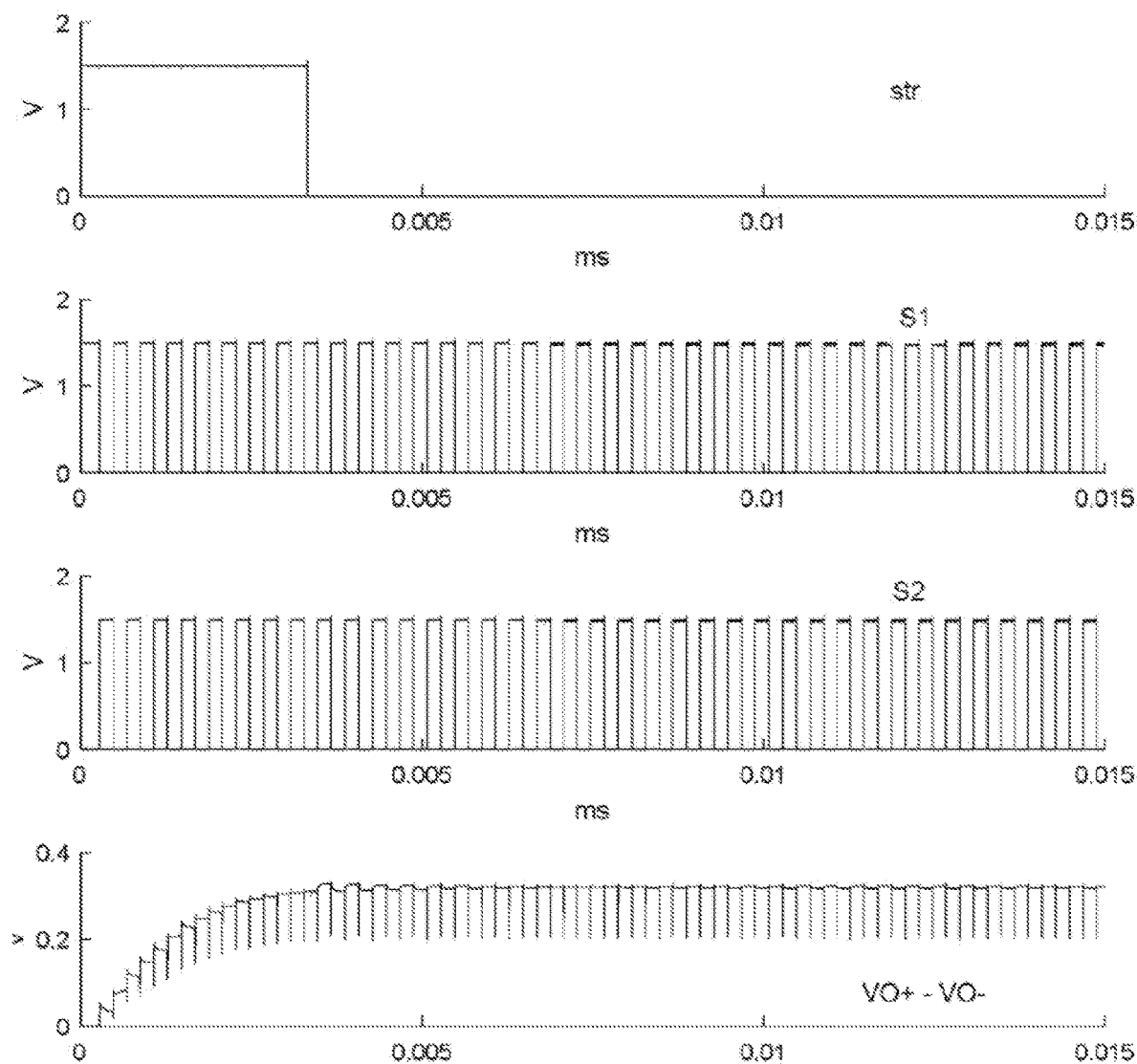
FIG. 10 illustrates an example output waveform of an instrumentation amplifier (IA), according to an aspect of the present disclosure.

FIG. 10 illustrates the exemplary output signal (including the clocks and str signal) of the IA 800 with 5 mV input and 64× gain.

Figure 11:
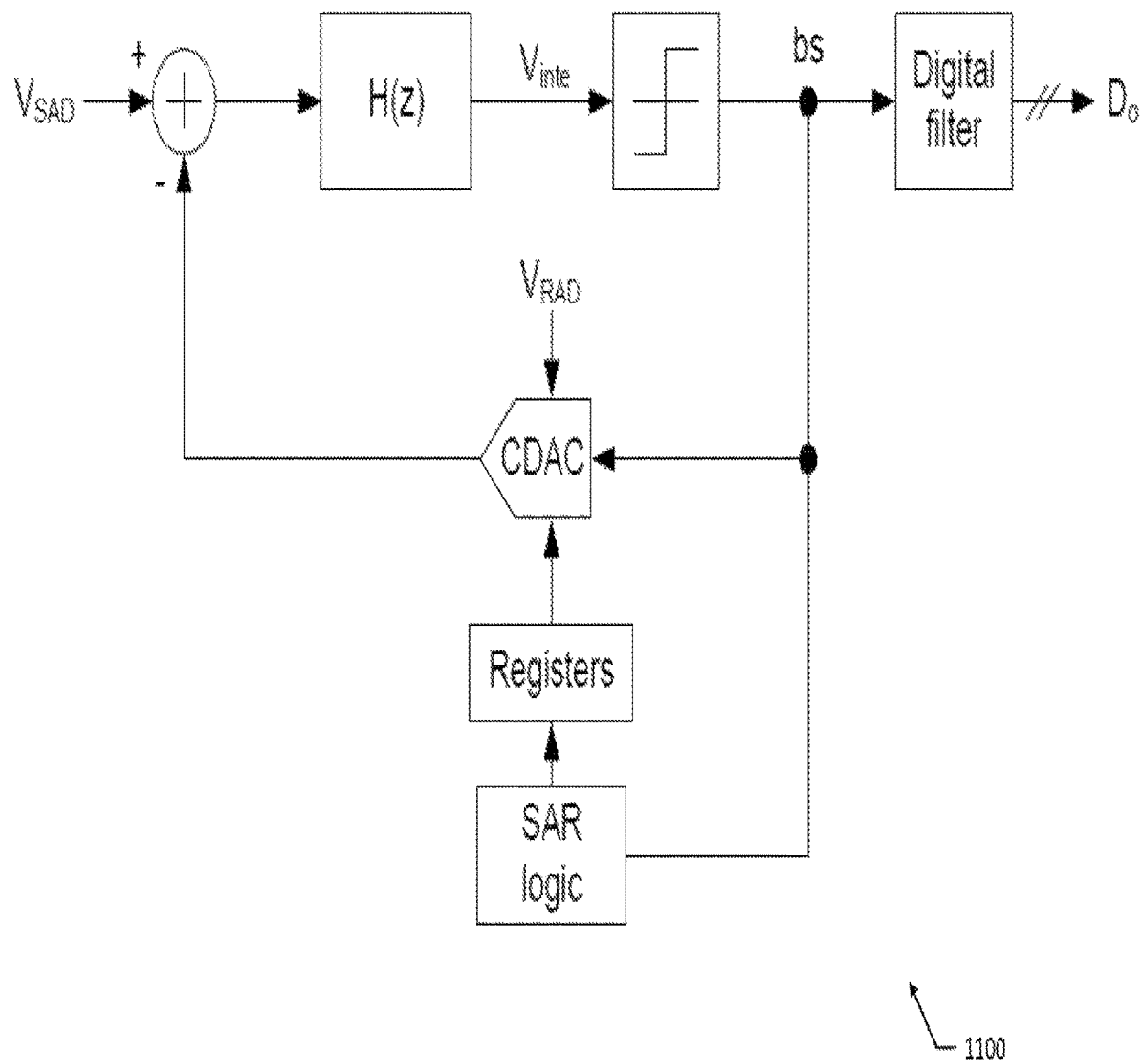
FIG. 11 illustrates a block diagram of an example analog-to-digital converter (ADC), according to an aspect of the present disclosure.

FIG. 11 illustrates a block diagram of an example analog-to-digital converter (A/D) 1100. In various examples, the incremental delta-sigma A/D used in the provided sensor interface can include a system level design of the A/D 1100. In some aspects, the A/D 1100 is a two-step architecture. In some aspects, two-step architecture uses the well-known zooming technique to achieve low power operation.

Figure 12:
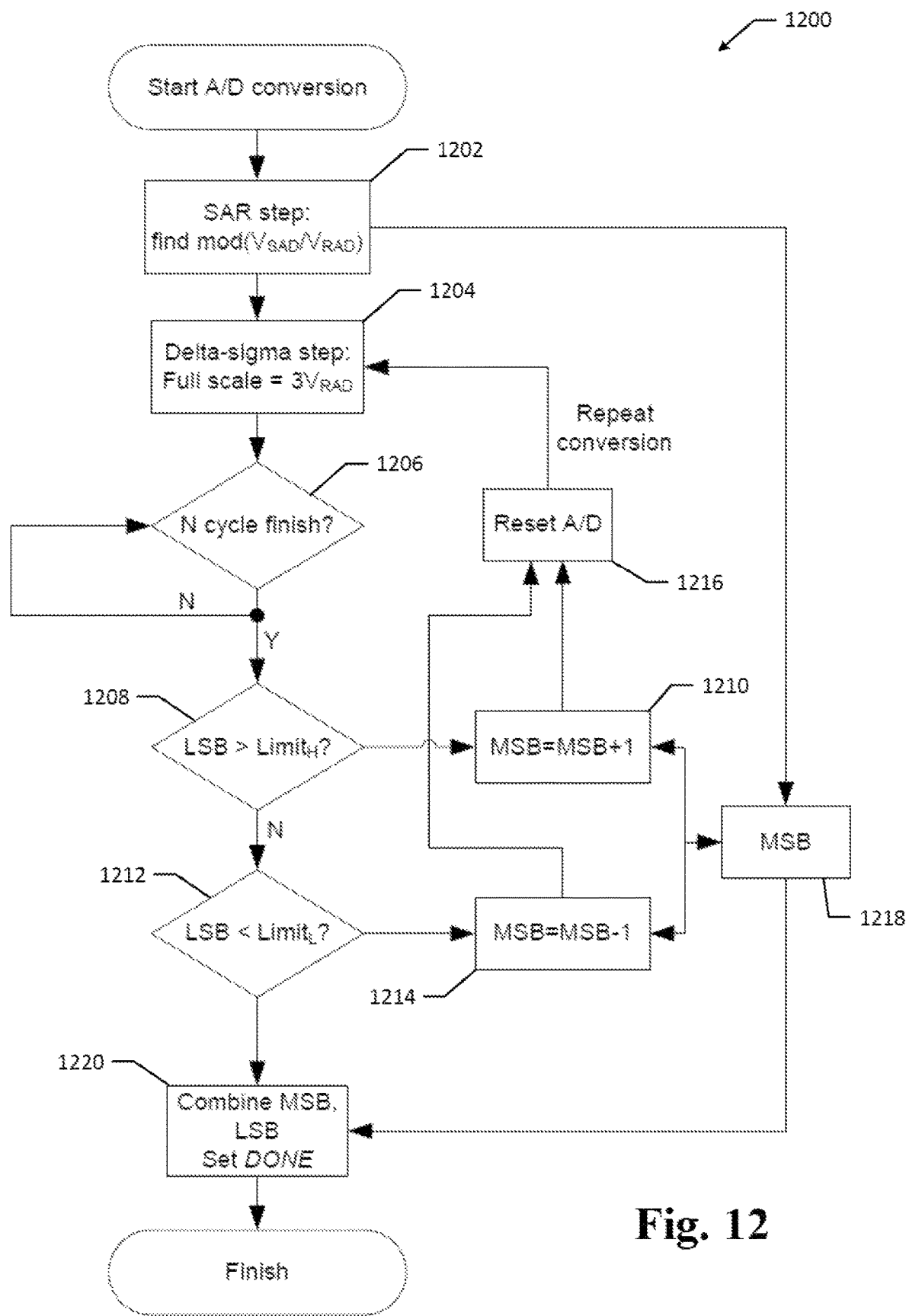
FIG. 12 illustrates a flow diagram of an example ADC control flow, according to an aspect of the present disclosure.

FIG. 12 illustrates a flow diagram of an example method 1200 for controlling the flow of an analog-to-digital converter (e.g., the A/D 1100). Although the example method 1200 is described with reference to the flow diagram illustrated in FIG. 12, it will be appreciated that many other methods of performing the acts associated with the method 1200 may be used. For example, the order of some of the blocks may be changed, certain blocks may be combined with other blocks, and some of the blocks described are optional. The method 1200 may be performed by processing logic that may comprise hardware (circuitry, dedicated logic, etc.), software, or a combination of both.

In various aspects, the method 1200 includes obtaining the integer part of m=$V_{SAD}/V_{RAD}$ using a SAR ADC, where m is recorded as the MSB value of the digital output (block 1202). An effective reference range of $3V_{RAD}$ may be used as the A/D reference (block 1204). Meanwhile, the net input of the A/D is $V_{SAD}-(m-2)*V_{RAD}$. By converting:

$$\frac{V_{SAD} - (m-2)*V_{RAD}}{3V_{RAD}}.$$

At block 1206, the method 1200 may include waiting until an N cycle is finished prior to proceeding. In the example method 1200, the least significant bit (LSB) value of the digital output may be obtained. However, if an incorrect conversion was obtained at block 1202 (e.g., due to large device mismatch, comparator offset, instantaneous noise, etc.), the LSB might be all zeros or all ones. In at least some aspects, before finishing the A/D conversion, the LSB data is compared with a predefined threshold $Limit_H$ and $Limit_L$. If LSB>$Limit_H$, it means the original most significant bit (MSB) m is too small and the net input voltage at block 1204 is too big (block 1208). In such instances, MSB may be modified to increase MSB (block 1210). If LSB <$Limit_L$, it means the original MSB m is too large and the net input voltage at block 1204 is too small (block 1212). In such instances, MSB may be modified to decrease MSB (block 1214).

In either instance of LSB>$Limit_H$ or LSB<$Limit_L$, the whole A/D 1100 may be reset to perform another conversion until the output LSB is in the designed range (block 1216). Once the output LSB is in the designed range, the MSB and LSB may be combined to form a 24 bit data (blocks 1218 and 1220). In some aspects, a DONE signal may be set at block 1220.

Figure 13:
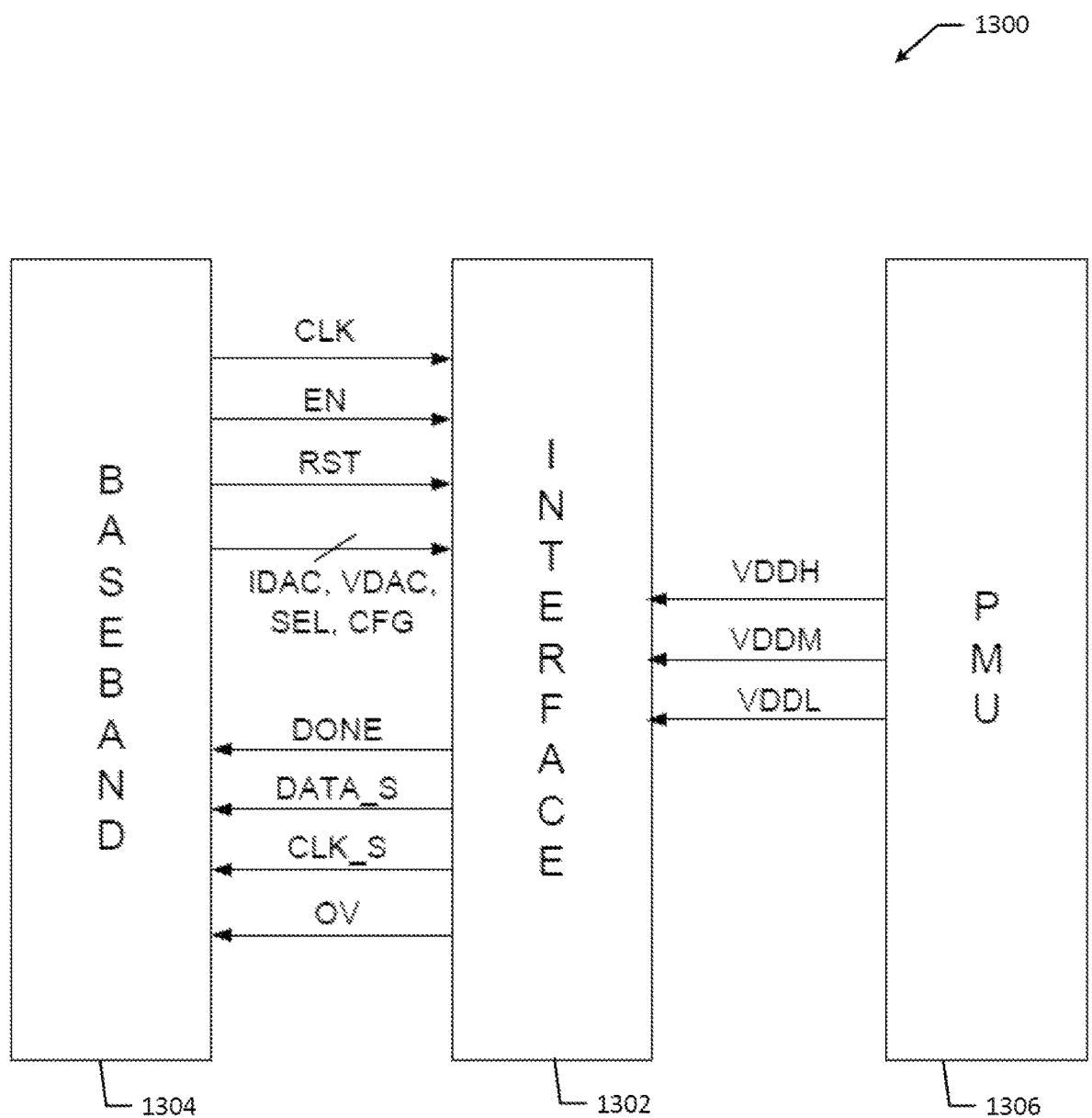
FIG. 13 illustrates a schematic of an example interface between a sensor interface and a baseband and the sensor interface and a RFID tag power management unit, according to an aspect of the present disclosure.

FIG. 13 shows a schematic of an example interface 1300 between a sensor interface 1302 and a baseband 1304, and the sensor interface 1302 and a RFID tag power management unit (PMU) 1306. In such example interface 1300, the number of interface signals is minimized by using a stand-alone digital controller in the interface block, which makes the whole chip to be modular. Minimizing the interface signals also helps enable the whole design to be used in other platforms as well.

When integrating the provided sensor interface into a fully passive RFID, there are various considerations when designing a chip floorplan. In some aspects, to avoid RF-induced signal deterioration, pre-filters are placed as close to the input pads AIN<0> to AIN<7> as possible. In such aspects, all the noisy circuit blocks including modulator, demodulator, baseband, clock generator are not placed near the interface and, in some examples, a thick guard-ring (P+ and N+) is added to isolate these blocks to avoid noise coupling to the interface block. Other floorplans are also feasible that suitably minimize the noise coupling between these noisy blocks and the interface circuit.

Figure 14:
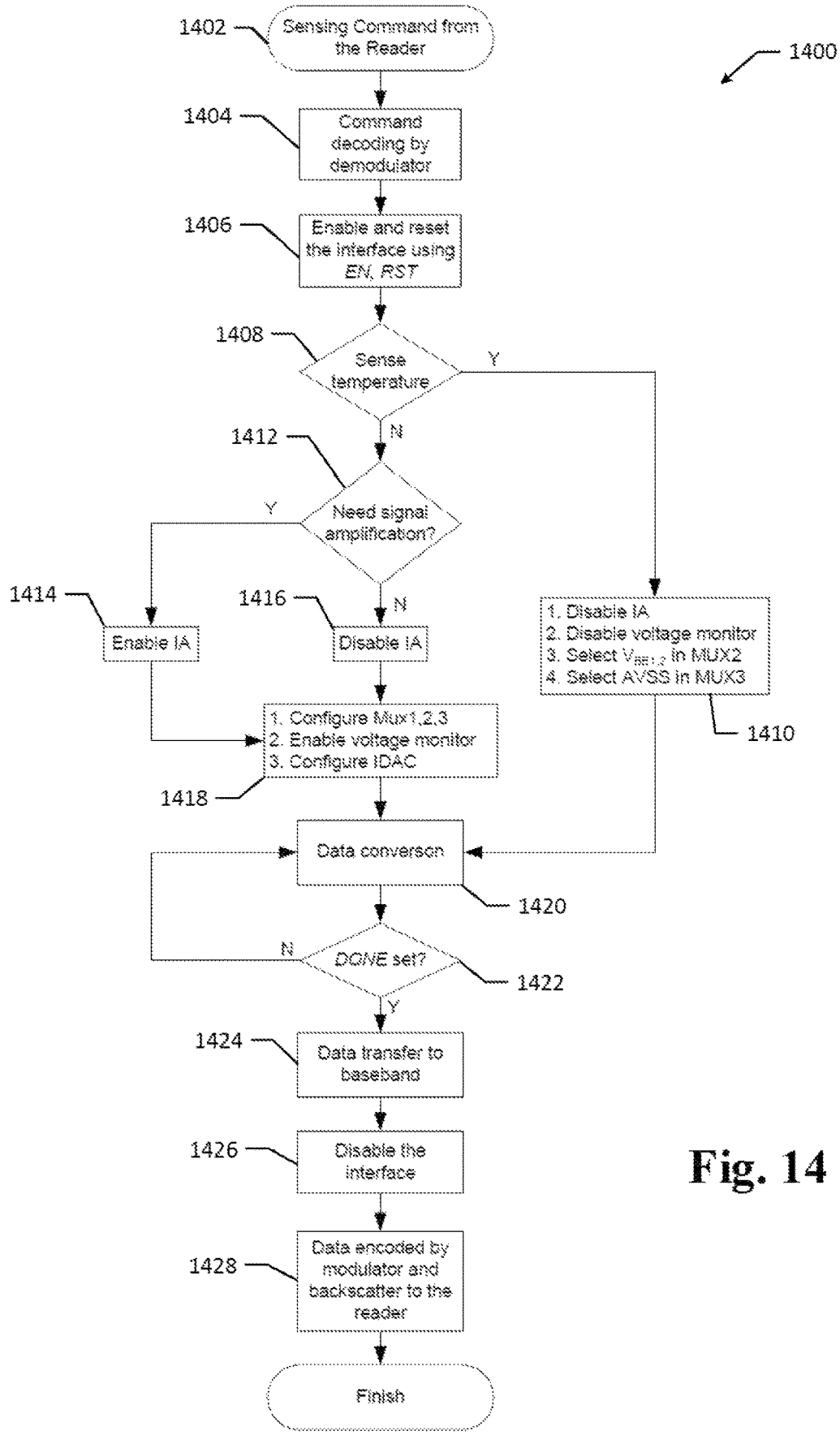
FIG. 14 illustrates a flow diagram of an example method for sensor interface operation flow, according to an aspect of the present disclosure.

FIG. 14 shows a flow diagram of an example method 1400 for sensor interface (e.g., the sensor interface 400) operation flow after being embedded in a passive RFID tag. Although the example method 1400 is described with reference to the flow diagram illustrated in FIG. 14, it will be appreciated that many other methods of performing the acts associated with the method 1400 may be used. For example, the order of some of the blocks may be changed, certain blocks may be combined with other blocks, and some of the blocks described are optional. The method 1400 may be performed by processing logic that may comprise hardware (circuitry, dedicated logic, etc.), software, or a combination of both.

In at least some aspects, the method 1400 may include sensing a command from an RFID reader (block 1402). A command may be made for a demodulator (e.g., the modulator/demodulator 312) to decode the sensed command (block 1404). In at least some aspects, the sensor interface 400 may be enabled and reset using EN, RST (block 1406). At block 1408, it may be determined whether temperature sensing is being or will be performed. If temperature sensing is being or will be performed, to maximally minimize the sensor interface 400 power consumption, the IA (e.g., the IA 800) and voltage monitor blocks can be disabled, in various aspects (block 1410). In some instances, $V_{BE1}$ and $V_{BE2}$ may be selected in MUX2 and/or AVSS may be selected in MUX3 (block 1410).

If temperature sensing is not and will not be performed, it can be determined whether signal amplification is needed (block 1412). If signal amplification is needed, the IA 800 may be enabled (block 1414). If signal amplification is not needed, the IA 800 may be disabled (block 1416). Whether the IA 800 is enabled or disabled, various actions may occur at block 1418 prior to data conversion. In various aspects, MUX1, MUX2, and/or MUX3 may be configured. In various aspects, the voltage monitor may be enabled. In various aspects, an IDAC current source may be configured. Data conversion may then be performed in instances in which temperature sensing is not and will not be performed (block 1420). For example, the method 1200 may be performed to convert data. In instances in which temperature sensing is being or will be performed, blocks 1412 to 1418 may be bypassed and the method 1200 may be performed to convert data after block 1410.

At block 1422, if a DONE signal has not yet been set, data conversion continues or repeats. For example, a portion of the method 1200 may repeat until an output LSB is in the designed range. If a DONE signal has been set, the converted data may be transferred to a baseband (e.g., the baseband 314) (block 1424). In at least some aspects, the sensor interface 400 may be disabled (block 1426). The modulator/demodulator 312 encodes the converted data and the information can be transmitted back to the RFID reader, such as by using a backscattering mechanism (e.g., impedance modulation) (block 1428).

In various instances, before deployment, the example system 300 or 340 may be calibrated following the same operation flow as the method 1400 but with known inputs. For example, for temperature sensor calibration, the temperature of the system 300 or 340 may be kept constant in temperature chambers. The corresponding digital output at this known temperature is used to correct the transfer curve of the system 300 or 340. This correction data is stored in the multiple-programmable memory (MTP) of the RFID. For other external sensors, their calibration data can also be stored in the MTP.

The presently disclosed interface system 300 or 340 may also be used in other platforms, including active, semi-passive RFIDs, BLE- and NFC-based wireless systems. Individual circuits disclosed herein, such as the provided IA 800, can also be used individually in other systems where low noise low power signal amplification is required.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated.

The invention is claimed as follows:

1. A passive Radio Frequency Identification (RFID) tag comprising:
an RFID chip; and
a sensor interface integrated with the RFID chip in the passive RFID tag, the sensor interface including an instrumentation amplifier including:
a first capacitor array connected to a positive terminal of an input voltage and a negative terminal of a reference voltage, the first capacitor array including a first input capacitor bank having a plurality of capacitors, a first feedback capacitor, and a first reference capacitor bank having a plurality of capacitors,
wherein the plurality of capacitors of the first input capacitor bank include a first capacitor, a second capacitor, and a third capacitor,
a second capacitor array connected to a negative terminal of the input voltage and a positive terminal of the reference voltage, the second capacitor array including a second input capacitor bank having a plurality of capacitors, a second feedback capacitor, and a second reference capacitor bank having a plurality of capacitors
wherein the input voltage is amplified by a gain determined by a ratio of a total capacitance ($C_{IN\_TOTAL}$) divided by a feedback capacitance ($C_{FB}$) of the first feedback capacitor,
wherein the total capacitance ($C_{IN\_TOTAL}$) is equal to a sum of a first capacitance of the first capacitor and a second capacitance of the second capacitor if a set gain is high,
wherein the total capacitance ($C_{IN\_TOTAL}$) is equal to a sum of the first capacitance of the first capacitor and a third capacitance of the third capacitor if the set gain is low,
wherein an effective input voltage ($V_{net}$) to the instrumentation amplifier is determined by:

$$V_{net} = (V_{in+} - V_{in-}) - \frac{C_{R_{TOTAL}}}{C_{IN_{TOTAL}}}(V_{ref+} - V_{ref-})$$

wherein
$V_{in+}$ is a voltage of the positive terminal of the input voltage,
$V_{in-}$ is a voltage of the negative terminal of the input voltage,
$C_{R_{TOTAL}}$ is a total capacitance of the first reference capacitor bank,
$V_{ref+}$ is a voltage of the positive terminal of the reference voltage, and
$V_{ref-}$ is a voltage of the negative terminal of the reference voltage.

2. The passive RFID tag of claim 1, wherein the instrumentation amplifier further includes a two-stage error amplifier configured to utilize Miller compensation.

3. The passive RFID tag of claim 1, wherein the instrumentation amplifier includes a capacitively-coupled instrumentation amplifier core.

4. The passive RFID tag of claim 1, configured such that the instrumentation amplifier is only enabled if signal amplification is performed via the passive RFID tag.

5. The passive RFID tag of claim 1, configured such that the instrumentation amplifier is disabled during direct voltage signal conversion.

6. The passive RFID tag of claim 1, configured such that the instrumentation amplifier is disabled during temperature sensing via the sensor interface.

7. The passive RFID tag of claim 1, wherein the instrumentation amplifier further includes two diode-connected PMOS configured to maintain a common level voltage at a first node connected to the first capacitor array and at a second node connected to the second capacitor array.

8. The passive RFID tag of claim 7, wherein the instrumentation amplifier is configured such that a first resistor is in series with the first node with a first transmission gate therebetween and a second resistor is in series with the second node with a second transmission gate therebetween, and
wherein during startup of the instrumentation amplifier, a resistance at the first node is equal to a first resistance of the first resistor and a resistance at the second node is equal to a second resistance of the second resistor.

* * * * *